United States Patent
Oveis Gharan et al.

(10) Patent No.: US 10,419,109 B1
(45) Date of Patent: Sep. 17, 2019

(54) PSEUDO FREQUENCY DIVISION MULTIPLEXING

(71) Applicants: Shahab Oveis Gharan, Nepean (CA); Michael Andrew Reimer, Stittsville (CA); Andrew D. Shiner, Kanata (CA); Hamid Ebrahimzad, Ottawa (CA); Maurice O'Sullivan, Ottawa (CA); Kim B. Roberts, Ottawa (CA)

(72) Inventors: Shahab Oveis Gharan, Nepean (CA); Michael Andrew Reimer, Stittsville (CA); Andrew D. Shiner, Kanata (CA); Hamid Ebrahimzad, Ottawa (CA); Maurice O'Sullivan, Ottawa (CA); Kim B. Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 16/124,479

(22) Filed: Sep. 7, 2018

(51) Int. Cl.
| | |
|---|---|
| H04B 10/00 | (2013.01) |
| H04B 10/079 | (2013.01) |
| H04J 14/00 | (2006.01) |
| H04B 10/50 | (2013.01) |
| H04B 10/66 | (2013.01) |

(52) U.S. Cl.
CPC ......... *H04B 10/0795* (2013.01); *H04B 10/50* (2013.01); *H04B 10/66* (2013.01); *H04J 14/00* (2013.01)

(58) Field of Classification Search
USPC .............................................. 398/202–214
See application file for complete search history.

(56) References Cited

U.S. PATENT DOCUMENTS

| | | | |
|---|---|---|---|
| 5,892,858 A | 4/1999 | Vaziri et al. | |
| 6,313,932 B1 | 11/2001 | Roberts et al. | |
| 7,522,841 B2 | 4/2009 | Bontu et al. | |
| 7,555,216 B2 * | 6/2009 | Yoshino | H04B 10/548 |
| | | | 398/193 |

(Continued)

OTHER PUBLICATIONS

Pending U.S. Appl. No. 15/672,434, filed Aug. 9, 2017.

(Continued)

*Primary Examiner* — Agustin Bello
(74) *Attorney, Agent, or Firm* — Integral Intellectual Property Inc.; Amy Scouten; Miriam Paton

(57) ABSTRACT

An optical transmitter is operable to generate an optical signal by modulating a number N of frequency divisional multiplexing (FDM) subcarriers using transformed digital signals which are determined by applying a pseudo FDM (pFDM) transformation to preliminary digital signals representative of multi-bit symbols. Rather than experiencing the effects of the number N of FDM channels, the optical signal experiences the effects of a different number M of pFDM channels, where M≠N. In some examples, the number M of pFDM channels is less than the number N of FDM channels, and frequency-dependent degradations may be averaged across different symbol streams. In other examples, the number M of pFDM channels is greater than the number N of FDM channels, and different symbol streams may experience different frequency-dependent degradations. An optical receiver is operable to apply an inverse pFDM transformation in order to recover estimates of the multi-bit symbols.

20 Claims, 14 Drawing Sheets

(56) References Cited

U.S. PATENT DOCUMENTS

| | | | |
|---|---|---|---|
| 2002/0118415 A1* | 8/2002 | Dasylva | H04J 14/02 398/48 |
| 2005/0074037 A1 | 4/2005 | Rickard et al. | |
| 2006/0147219 A1* | 7/2006 | Yoshino | H04B 10/548 398/183 |
| 2017/0012704 A1 | 1/2017 | Oveis Gharan et al. | |

OTHER PUBLICATIONS

Pending U.S. Appl. No. 16/003,736, filed Jun. 8, 2018.

Du, et al., "Optimizing the subcarrier granularity of coherent optical communications systems", Optics Express, vol. 19, Issue 9, pp. 8079-8084, Apr. 12, 2011.

Jansen, et al., "Coherent Optical 25.8-Gb/s OFDM Transmission Over 4160-km SSMF", Journal of Lightwave Technology, vol. 26, No. 1, pp. 6-16, Jan. 1, 2008.

Liu, "Twin-Wave-Based Optical Transmission with Enhanced Linear and Nonlinear Performances," Journal of Lightwave Technology, vol. 33, Issue 5, pp. 1037-1043, Mar. 2015.

Poggiolini, et al., "Analytical results on system maximum reach increase through symbol rate optimization," in Optical Fiber Communication Conference, OSA Technical Digest, Optical Society of America, paper Th3D.6., Mar. 22, 2015.

Poggiolini, et al., "Analytical and Experimental Results on System Maximum Reach Increase Through Symbol Rate Optimization", Journal of Lightwave Technology, vol. 34, No. 8, Apr. 15, 2016.

Shibahara, et al., "Filtering-tolerant transmission by the Walsh-Hadamard transform for super-channel beyond 100 Gb/s", Optical Society of America, vol. 23, No. 10, May 12, 2015.

Zhu, et al., "Pairwise Coding to Mitigate Polarization Dependent Loss", OFC, 2015.

Zhu, et al., "Subband Pairwise Coding for Robust Nyquist-WDM Superchannel Transmission", Journal of Lightwave Technology, vol. 34, No. 9, Apr. 15, 2016.

\* cited by examiner ns channel established between the optical receiver and an optical transmitter, wherein the received optical signal comprises a degraded version of a modulated optical signal generated at the optical transmitter. The optical receiver is further operable to determine N sets of received digital signals corresponding to N respective frequency division multiplexing (FDM) channels of the received optical signal at a single timeslot, wherein N>1. The optical receiver is further operable to determine N sets of preliminary signal estimates using the N sets of received digital signals and an inverse pseudo FDM (pFDM) transformation, wherein each set of preliminary signal estimates is determined from a respective combination of the N sets of received digital signals, and wherein each respective combination is determined from the inverse pFDM transformation. The optical receiver is further operable to determine N multi-bit symbol estimates using the N respective sets of preliminary signal estimates.

PSEUDO FREQUENCY DIVISION MULTIPLEXING

TECHNICAL FIELD

This document relates to the technical field of optical communications.

BACKGROUND

In an optical communications system, a transmitter may encode client data bits by mapping them to multi-bit symbols, and then using a particular modulation scheme to modulate one or more optical carriers with the symbols, thereby generating an optical signal to be transmitted via a communications channel to a receiver, where the optical signal is representative of digital information. The receiver may process an optical signal received via the communications channel to recover estimates of the multi-bit symbols, the client data bits, or both.

The optical signal received at the receiver may comprise a degraded version of the optical signal that was generated at the transmitter. Various components of the optical communications system may contribute to signal degradation, including optical fibers, optical amplifiers, filters, isolators, and the like. Amplifier noise, optical nonlinearity, polarization-dependent loss or gain (PDL), polarization mode dispersion (PMD), frequency-dependent loss, and other effects may introduce noise and/or distortion into the signal. The amplitude of the noise relative to the amplitude of the optical signal may be characterized by the signal-to-noise ratio (SNR), or alternatively by the noise-to-signal ratio (NSR). The NSR may be convenient when dissecting noise sources. A high NSR may result in noisy symbol estimates, which may in turn produce erroneous estimates of the client data bits. The probability that client data bit estimates recovered at the receiver will differ from the original client data bits encoded at the transmitter may be characterized by the Bit Error Ratio or Bit Error Rate (BER). A given application may have a maximum BER tolerance. For example, an application may require that the BER not exceed $10^{-16}$.

Forward Error Correction (FEC) techniques may be used to reduce the BER. Instead of the transmitter mapping the original client data bits directly to multi-bit symbols, the client data bits may first undergo FEC encoding based on a chosen FEC scheme. The resulting FEC-encoded bits include redundant information, such as parity or check bits. The bit estimates recovered at the receiver will be estimates of the FEC-encoded bits that were generated the transmitter. These estimates may undergo FEC decoding at the receiver based on the chosen FEC scheme. The FEC decoding makes use of the redundant information that was included in the FEC-encoded bits in order to detect and correct bit errors.

FEC encoding is advantageous in that it may permit error control without the need to resend data packets. However, this is at the cost of increased overhead. The amount of overhead or redundancy added by FEC encoding may be characterized by the information rate R, where R is defined as the ratio of the amount of input information to the amount of data that is output after FEC encoding (which includes the overhead). For example, if FEC encoding adds 25% overhead, then for every four information bits that are to be FEC-encoded, the FEC encoding will add 1 bit of overhead, resulting in 5 FEC-encoded data bits to be transmitted to the receiver. This corresponds to an information rate R=4/5=0.8.

SUMMARY

According to a broad aspect, an optical receiver is operable to receive an optical signal over an optical communi- According to some examples, the inverse pFDM transformation averages frequency-dependent signal degradations in the received digital signals.

According to some examples, the inverse pFDM transformation comprises a matrix, and wherein the matrix is substantially linear and substantially unitary.

According to some examples, the dimensions of the optical carrier are modulated at the optical transmitter based on transformed digital drive signals, the transformed digital drive signals having been determined at the optical transmitter using a pFDM transformation and preliminary digital drive signals.

According to some examples, the pFDM transformation comprises a first matrix, wherein the inverse pFDM transformation comprises a second matrix, wherein the first and second matrices are substantially linear and substantially unitary, and wherein the second matrix is substantially the inverse of the first matrix.

According to some examples, the first matrix is frequency-dependent.

According to some examples, the pFDM transformation involves time-domain linear filtering.

According to another broad aspect, an optical receiver is operable to receive an optical signal over an optical communications channel established between the optical receiver and an optical transmitter, wherein the received optical signal comprises a degraded version of a modulated optical signal generated at the optical transmitter. The optical receiver is further operable to determine N sets of received digital signals corresponding to N respective timeslots for a single division multiplexing (FDM) channel of the received optical signal, the N sets of received digital signals being distributed over M pseudo FDM (pFDM) channels that are partially overlapping and non-orthogonal in frequency, wherein N>1, wherein M>1, and wherein M≤N. The optical receiver is further operable to determine N sets of preliminary digital drive signal estimates using the N sets of received digital signals and an inverse pFDM transformation, wherein each set of preliminary digital drive signal estimates is determined from a respective combination of the N sets of received digital signals, wherein each respective combination is determined from the inverse pFDM transformation. The optical receiver is further operable to determine N multi-bit symbol estimates using the N respective sets of preliminary digital drive signal estimates.

According to some examples, the timeslots are consecutive.

According to some examples, the inverse pFDM transformation is implemented by recursive matrix multiplication using a substantially linear and substantially unitary matrix, and wherein M<N.

According to some examples, the pFDM channels have substantially equal bandwidths.

According to some examples, the pFDM channels have a range of bandwidths.

According to some examples, the N sets of received digital signals are unevenly distributed over the M pFDM channels.

DETAILED DESCRIPTION

Figure 1:
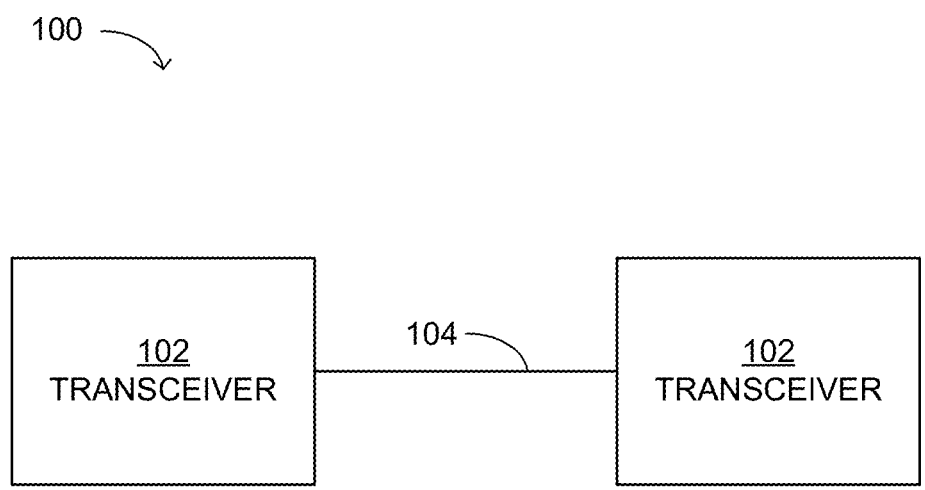
FIG. 1 illustrates an example optical communications system in accordance with the technology disclosed herein.

FIG. 1 illustrates an optical communications system 100 in accordance with the technology disclosed herein. The communications system 100 comprises transceivers 102. An optical signal, representative of digital information (also referred to as client data), is transmitted between the transceivers 102 via an optical communications channel 104. For the purposes of the present disclosure, it is convenient to consider the optical signal as a function of four orthogonal dimensions versus time. The four orthogonal dimensions comprise the respective in-phase (I) and quadrature (Q) components of each of two orthogonal polarizations, denoted generically as X and Y. For notation purposes, the four dimensions at a particular timeslot, t, may be denoted as XI(t), XQ(t), YI(t), and YQ(t).

In U.S. Pat. No. 6,313,932 entitled "Multiplexed Transmission of Optical Signals" (2001), Roberts et al. describe transmitting a train of optical pulses which are multiplexed by wavelength division multiplexing (WDM) to provide a large number of channels.

Frequency division multiplexing (FDM) may be used to digitally divide up the spectrum of an optical carrier into a plurality of subcarriers of different frequencies, such that each subcarrier may be used to transmit a signal that is representative of a different stream of multi-bit symbols. In this manner, a plurality of symbol streams may be simultaneously communicated, in parallel, over the optical communications channel. FDM is possible when the frequencies of the subcarriers are sufficiently separated that the bandwidths of the signals do not overlap. Each different subcarrier frequency corresponds to a different FDM channel.

Orthogonal FDM uses numerous closely spaced orthogonal subcarrier signals with overlapping spectra to carry data. In United States Patent Application Publication No. 2005/0074037 entitled "Optical Sub-Carrier Multiplexed Transmission" (2005), Rickard et al. describe the use of a Discrete Fourier Transform (DFT) to create OFDM subcarriers for optical transmission. In "Coherent Optical 25.8-Gb/s OFDM Transmission Over 4160-km SSMF", *Journal of Lightwave Technology*, Vol. 26, Issue 1, pp. 6-15 (2008), Jansen et al. describe the use of a cyclic prefix to tolerate chromatic dispersion of optical OFDM.

The transceivers 102 may be flexible, such that various configuration parameters of the transceivers 102 can be adjusted. For the optical communications system 100 to be operable, the configuration parameters of a transmitter section of one of the transceivers 102 must be compatible with the configuration parameters of a receiver section of the other of the transceivers 102. Examples of configuration parameters include a modulation format or scheme, symbol rate, forward error correction (FEC) parameters, digital signal processing (DSP) parameters, pulse shaping parameters, the number of subcarriers for FDM, chromatic dispersion compensation parameters, carrier phase recovery parameters, and digital nonlinear compensation parameters.

A signal transmitted via the optical communications channel 104 may be altered by various elements of the optical communications system 100, such as optical fibers, optical amplifiers, filters, isolators, wavelength-selective switches, and the like. For example, the passage of a signal through an optical fiber or an optical filter may attenuate the optical signal, whereas the passage of the signal through an optical amplifier may strengthen the signal. The signal loss (or signal gain) caused by a given component may depend on the polarization state of the signal. In general, this effect is referred to as polarization-dependent loss or gain (denoted PDL). Where two channels of information are transmitted on the same carrier frequency using waves of two orthogonal polarization states, a given element of the system may cause each channel to experience a different level of PDL. PDL is cumulative across all elements in the optical communications system. As a result of PDL, one polarization may be noisier than another polarization.

Random imperfections in an optical fiber may cause two orthogonal polarizations to propagate with different speeds. This effect, referred to as polarization mode dispersion (PMD), causes the two polarization components of a signal to slowly separate over the length of an optical fiber, thereby causing pulses to broaden and overlap. The PMD of a signal may be characterized by a number, M, of timeslots over which the overlapping occurs. The number M may also be referred to as the PMD "memory". PMD compensation may be achieved using an adaptive filter at the receiver, such as a least means squares (LMS) circuit. However, an LMS circuit may add a correlation between noise components of the symbols at different times. This noise correlation may be observed in the same M timeslots in which PMD memory is observed.

Degradations in the optical signal may also be dependent on frequency. For example, different FDM channels may experience different levels of attenuation.

As described by Du et al. in "Optimizing the subcarrier granularity of coherent optical communications systems", *Optics Express*, Vol. 19, No. 9, pp. 8079-8084 (2011), the symbol rate has a significant effect on the nonlinearity-limited performance of coherent optical communications systems. The findings of Du et al. suggest that the maximum capacity of nonlinear dispersive optical links can only be achieved by using multiple electrical subcarriers carrying a few Gbaud each, and not by high symbol rate systems. These electrical subcarriers are orthogonal in that they occupy disjoint frequency bands. The spectral shape typically transmitted within each band is a root-raised-cosine, so that matched filtering in the receiver produces minimum noise and zero correlation between the values at any two distinct symbol-sampling times (i.e., zero inter-symbol interference or ISI). Wiener filtering performed at the receiver may modify this by jointly optimizing noise and ISI, thereby resulting in small amounts of ISI, with the symbols remaining substantially uncorrelated in time. Partial response methods, such as those described by Vaziri et al. in U.S. Pat. No. 5,892,858 entitled "Duobinary Coding and Modulation Technique for Optical Communication Systems" (1999) may be used to deliberately introduce large correlations in time.

In "Analytical and Experimental Results on System Maximum Reach Increase Through Symbol Rate Optimization", *Journal of Lightwave Technology*, Vol. 34, No. 8, pp. 1872-1885 (2016), Poggiolini et al. demonstrated that the optimum symbol rate of such a subcarrier is inversely proportional to the square root of the total dispersion in the optical line. Therefore, a fixed moderate number of subcarriers, such as four or eight, will not be optimum over a high-dispersion line. However, supporting a variable number of FDM subcarriers may require significant design complexity, and may also be sensitive to laser linewidth for a large number of FDM subcarriers.

In "Filtering-tolerant transmission by the Walsh-Hadamard transform for super-channel beyond 100 Gb/s," *Optical Society of America,* 2015, Shibahara et al. describe a method for improving super-channel performance by dispersing optical filtering distortions over all subcarriers of a super-channel. The method involves applying a Walsh-Hadamard transform (WHT) to the subcarriers, where each subcarrier corresponds to a different wavelength.

In "Twin-Wave-Based Optical Transmission with Enhanced Linear and Nonlinear Performances," *Journal of Lightwave Technology*, Vol. 33, Issue 5, pp. 1037-1043 (2015), Liu describes a method for converting a binary phase-shift keying (BPSK) signal to a "Twin-Wave" QPSK signal, with conjugate phase properties.

In "Pairwise Coding to Mitigate Polarization Dependent Loss", *Optical Fiber Communication Conference* (2015), and in "Subband Pairwise Coding for Robust Nyquist-WDM Superchannel Transmission", *Journal of Lightwave Technology*, Vol. 34, No. 8, pp. 1746-1753 (2016), Zhu et al. describe the use of pairwise coding across WDM subbands to improve tolerance to interchannel interference (ICI). The Q dimension from an edge subband is swapped with the I dimension from a center subband. If a QPSK constellation is then rotated to be at 45 degrees to I and Q, and rescaled, this reduces the penalty from ICI on the edge subband.

Figure 2:
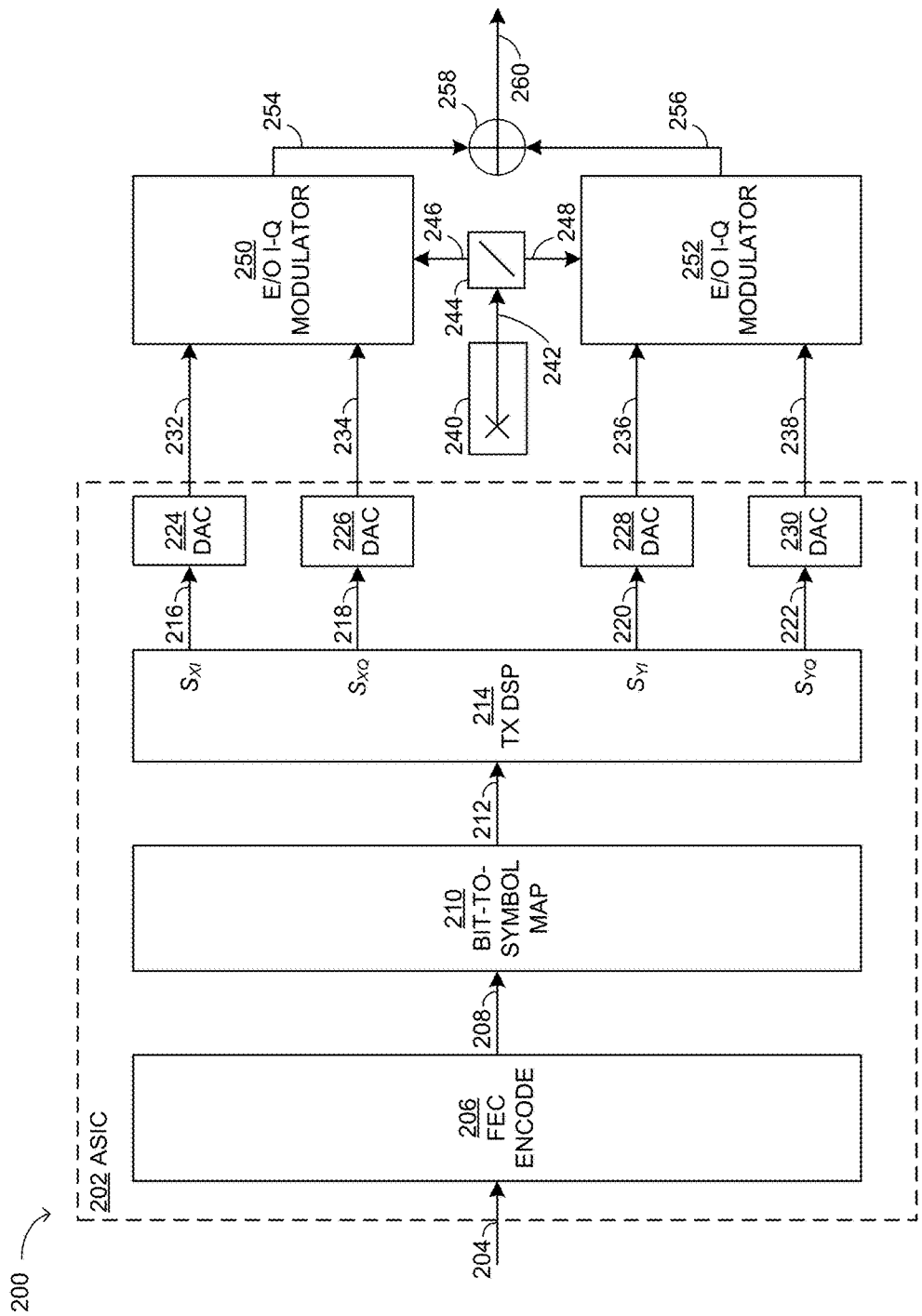
FIG. 2 illustrates an example transmitter in accordance with the technology disclosed herein.

FIG. 2 is a block diagram illustration of an example transmitter section 200 of a transceiver ("transmitter 200"), in accordance with examples of the technology disclosed herein.

The transmitter 200 is operative to transmit an optical signal 260 which is representative of client data bits 204. The transmitter 200 employs polarization-division multiplexing (PDM). In other examples (not shown), generation of the optical signal may involve alternative techniques, such as single polarization modulation, modulation of an unpolarized carrier, mode-division multiplexing, spatial-division multiplexing, Stokes-space modulation, polarization balanced modulation, and the like. A laser 240 is operative to generate a continuous wave (CW) optical carrier 242. A polarizing beam splitter 244 is operative to split the CW optical carrier 242 into orthogonally-polarized components 246, 248 that are modulated by respective electrical-to-optical modulators 250, 252 to produce modulated polarized optical signals 254, 256 that are combined by a beam combiner 258, thus yielding an optical signal 260.

An application-specific integrated circuit (ASIC) 202 is operative to produce I and Q analog drive signals 232, 234 to drive the electrical-to-optical modulator 250. The ASIC 202 is also operative to produce I and Q analog drive signals 236, 238 to drive the electrical-to-optical modulator 252.

The ASIC 202 may be operative to apply FEC encoding 206 to the client data bits 204, thereby generating FEC-encoded bits 208. The FEC-encoded bits 208 may be mapped to multi-bit symbols in accordance with a specific code, as denoted by bit-to-symbol mapping 210. The bit-to-symbol mapping 210 may produce one or more streams of multi-bit symbols 212.

The ASIC 202 further comprises a transmit digital signal processor (DSP) 214 and a plurality of digital-to-analog converters (DACs). The transmit DSP 214 is operative to process the symbols 212, for example, by performing one or more of pulse shaping, subcarrier multiplexing, chromatic dispersion precompensation, and distortion precompensation on the symbols. The processing performed by the transmit DSP 214 may include the application of one or more filters, which may involve the application of one or more Fast Fourier Transforms (FFTs) and one or more corresponding inverse FFTs (IFFTs).

Based on the symbols 212 and a selected modulation scheme, the transmit DSP 214 is operative to generate four digital drive signals at each particular timeslot, t, corresponding to the four dimensions XI, XQ, YI, YQ. For example, digital drive signals 216, 218 may correspond to the I and Q components, respectively, of the X polarization, while digital drive signals 220, 222 may correspond to the I and Q components, respectively, of the Y polarization. According to this example, at the timeslot, t, the digital drive signals 216, 218 may be denoted $S_{XI}(t)$, $S_{XQ}(t)$, respectively, while digital drive signals 220, 222 may be denoted $S_{YI}(t)$, $S_{YQ}(t)$, respectively.

As noted above, the transmit DSP 214 may be operative to perform subcarrier multiplexing. Thus, the symbols 212 may be divided into P parallel streams of symbols, where P>1, and each stream may be modulated onto a separate subcarrier frequency of the optical carrier 242. At a particular timeslot, t, the digital drive signals 216, 218, 220, 222 corresponding to the $K^{th}$ subcarrier may be denoted, collectively, as $S_K(t)$, for K=1 . . . N, and where N≥P. For simplicity, it may be assumed that each one of the N FDM subcarriers is used transmit a separate stream of symbols, such that P=N.

The digital drive signals 216, 218, 220, 222 may be converted by respective DACs 224, 226, 228, 230 into the analog drive signals 232, 234, 236, 238, respectively. As previously described, the analog drive signals 232, 234, 236, 238 are used to drive the electrical-to-optical modulators 250, 252, which ultimately results in the optical signal 260.

Although illustrated as comprised in the ASIC 202, in an alternate implementation the DACs 224, 226, 228, 230 may be separate from the ASIC 202. The transmitter 200 may comprise additional components that are not described in this document.

Figure 3:
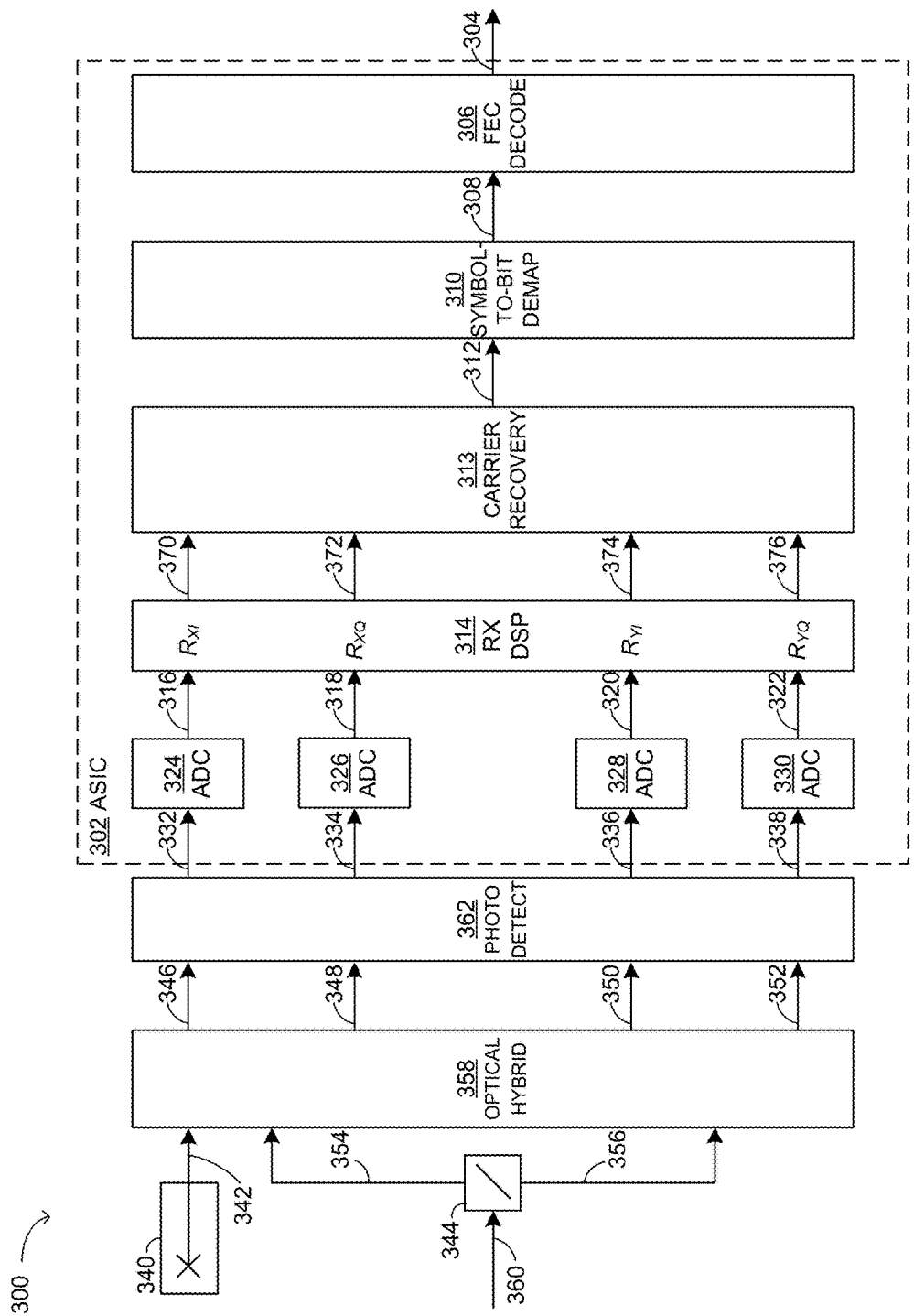
FIG. 3 illustrates an example receiver in accordance with the technology disclosed herein.

FIG. 3 is a block diagram illustration of an example receiver section of a transceiver ("receiver 300"), in accordance with examples of the technology disclosed herein.

The receiver 300 is operative to recover corrected client data bits 304 from a received optical signal 360. The received optical signal 360 may comprise a degraded version of the optical signal 260 generated by the transmitter 200, where the degradations in the received optical signal 360 may have been caused, for example, by one or more of noise, nonlinear effects, PDL, and imperfections in analog signal processing performed at the transmitter 200. A polarizing beam splitter 344 is operative to split the received optical signal 360 into orthogonally-polarized components 354, 356. An optical hybrid 358 is operative to process the components 354, 356 with respect to an optical signal 342 produced by a laser 340. Photodetectors 362 are operative to convert the outputs 346, 348, 350, 352 of the optical hybrid 358 to received analog signals 332, 334, 336, 338, respectively. The four received analog signals correspond to the four dimensions XI, XQ, YI, YQ at a particular timeslot, t.

An ASIC 302 comprises analog-to-digital converters (ADCs) 324, 326, 328, 330 which are operative to sample the received analog signals 332, 334, 336, 338, respectively, and to generate received digital signals 316, 318, 320, 322, respectively. In one example, the received analog signals 332, 334 may correspond to the I and Q components, respectively, of the X polarization, while the received analog signals 336, 338 may correspond to the I and Q components, respectively, of the Y polarization. According to this example, at the timeslot, t, the received digital signals 316, 318 may be denoted $R_{XI}(t)$, $R_{XQ}(t)$, respectively, while the received digital signals 320, 322 may be denoted $R_{YI}(t)$, $R_{YQ}(t)$, respectively.

The ASIC 302 comprises a receive DSP 314 which is operative to process the received digital signals 316, 318, 320, 322. For example, the receive DSP 214 may be operative to apply one or more filters to the digital signals 316, 318, 320, 322, which may involve the application of one or more FFTs and one or more corresponding IFFTs. The receive DSP 314 may output digital signals 370, 372, 374, 376 based on the digital signals 316, 318, 320, 322, respectively.

Where the received digital signals 316, 318, 320, 322 have been generated using FDM, they may be representative of P streams of symbols carried over N FDM channels, where N≥P. At a particular timeslot, t, the received digital signals 316, 318, 320, 322 corresponding to the $K^{th}$ FDM channel may be denoted, collectively, as $R_K(t)$, for K=1 . . . N. For simplicity, it may be assumed that each one of the N FDM channels is used transmit a separate stream of symbols, such that P=N.

The ASIC 302 is operative to apply a carrier recovery process 313 to the digital signals 370, 372, 374, 376 in order to derive symbol estimates 312 for the two orthogonal polarizations. The symbol estimates 312 are estimates of the symbols 212 that were generated by the bit-to-symbol mapping 210 performed at the transmitter 200. Thus, where the symbols 212 comprise N parallel streams of symbols, the symbol estimates 312 may comprises N parallel streams of symbol estimates.

The ASIC 302 is operative to apply symbol-to-bit demapping 310 to the symbol estimates 312 in order to derive bit estimates 308. The symbol-to-bit demapping 310 involves applying an inverse of the code that was used in the bit-to-symbol mapping 210. The bit estimates 308 are estimates of the bits 208 that were generated by the FEC encoding 206 at the transmitter 200. A bit estimate may comprise a binary value, or may comprise a confidence value, such as a log-likelihood ratio. In the case of a binary value (i.e., a bit), the log-likelihood ratio (LLR) is defined as the logarithm of the ratio of the probability of the bit being equal to one to the probability of the bit being equal to zero. For example, for a bit b, $$LLR(b) = \log \frac{P(b=1)}{P(b=0)},$$

where P denotes probability. For non-binary values, such as a set of integers, other metrics could be used, such as the logarithm of the probability of a given integer value divided by the sum of the probabilities of the other possible integer values, for example.

The ASIC 302 is operative to apply FEC decoding 306 to the bit estimates 308 in order to recover the corrected client data bits 304. The FEC decoding 306 may comprise hard-decision decoding or soft-decision decoding. One example of soft-decision decoding is Maximum Likelihood (ML) decoding. If the FEC decoding 306 is able to correct all errors present in the FEC-encoded bit estimates 308, then the corrected client data bits 304 will be identical to the original client data bits 204. If the FEC decoding 306 is unable to correct all errors present in the FEC-encoded bit estimates 308, then the corrected client data bits 304 will differ from the original client data bits 204. In this case, the FEC scheme chosen for the FEC encoding 206 and FEC decoding 306 will be considered to have failed.

Although illustrated as comprised in the ASIC 302, in an alternate implementation the ADCs 324, 326, 328, 330 may be separate from the ASIC 302. The receiver 300 may comprise additional components that are not described in this document.

The success or failure of a given FEC scheme depends on its strength relative to the extent of the errors present in the FEC-encoded bit estimates. FEC decoding will generally respond to the average bit error rate (BER) of the FEC-encoded bit estimates to which it is applied. The average BER observed at the input of the FEC decoding may be denoted $BER_{FEC\_AVG}$. Hard decision FEC decoding may be unable to correct all of the errors in the FEC-encoded bit estimates when $BER_{FEC\_AVG}$ exceeds some threshold, denoted $BER_{THRESH}$. In other words, the FEC scheme used for the FEC encoding at the transmitter and the FEC decoding at the receiver is expected to fail when $BER_{FEC\_AVG} > BER_{THRESH}$. In one example, $BER_{THRESH}$ is on the order of $3.84 \times 10^{-3}$.

Generally, the BER of the FEC-encoded bit estimates 308 is expected to increase as the noise in the received optical signal 360 increases. The precise relationship between the noise-to-signal ratio (NSR) and BER depends on the code used for the bit-to-symbol mapping 210 and modulation scheme used by the transmit DSP 214 to convert the symbols 212 to the digital drive signals 216, 218, 220, 222, and also on the shape of the four-dimensional probability density function of the noise, in the event that the noise is not isotropic Gaussian noise.

Figure 4:
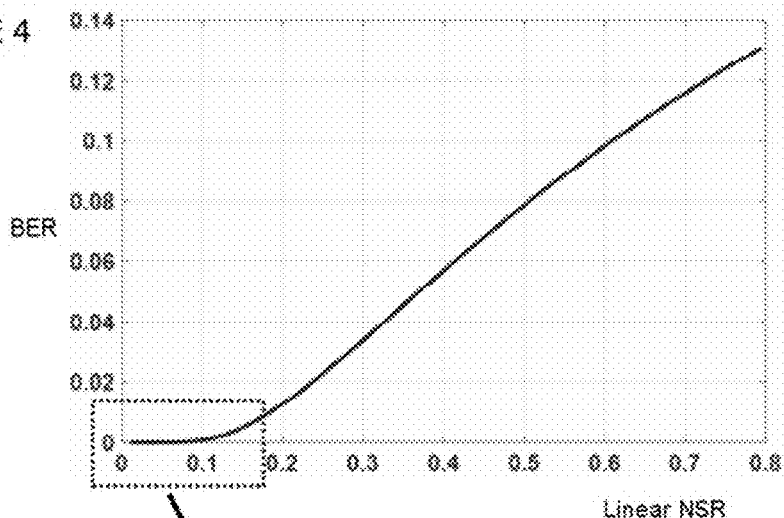
FIG. 4 illustrates a plot of bit error rate (BER) as a function of the linear noise-to-signal ratio (NSR) for a 64-level quadrature amplitude modulation (64-QAM) scheme.

FIG. 4 illustrates a plot of BER as a function of the linear NSR for a 64-level quadrature amplitude modulation (64-QAM) scheme.

There may be circumstances in which different streams of bits (or symbols) experience different noise levels. For example, as described previously, frequency-dependent loss may cause different FDM channels to have different noise levels. Thus, for example, symbols transmitted on one FDM channel may exhibit a different level of the noise than symbols transmitted on another FDM channel. It follows that the FEC-encoded bit estimates determined from one symbol stream may have a different BER than the FEC-encoded bit estimates determined from another symbol stream.

One may consider a simple example in which a first set of FEC-encoded bit estimates exhibits a first BER, denoted $BER_A$, and a second set of FEC-encoded bit estimates exhibits a second BER, denoted $BER_B$, where $BER_A \neq BER_B$. If the number of FEC-encoded bit estimates in each set is equal, the average BER across the two sets would be $BER_{FEC\_AVG} = (BER_A + BER_B)/2$. If hard decision FEC decoding is applied to the two sets, the FEC scheme is expected to fail if $BER_{FEC\_AVG} = (BER_A + BER_B)/2$ exceeds $BER_{THRESH}$ for the FEC scheme. This is because the performance of the FEC depends on the average BER of the FEC-encoded bit estimates to which it is applied.

Figure 5:
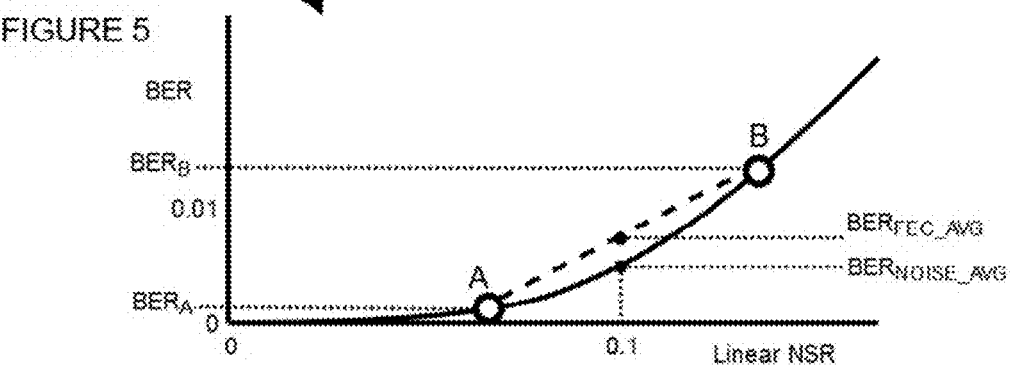
FIG. 5 illustrates a magnified portion of the plot illustrated FIG. 4 with example points A and B.

The differing BER values of the FEC-encoded bit estimates are the result of differing noise levels in the symbol estimates from which the FEC-encoded bit estimates were determined. As an alternative to applying FEC decoding to sets of bits that exhibit the different BERs, there may be advantages to achieving a more uniform noise level across the symbol estimates, such that the FEC-encoded bit estimates determined from the symbol estimates have a more uniform BER. A more uniform noise level may be achieved across all symbol estimates by averaging the different noise levels exhibited by different groups of symbol estimates.

Where a noise averaging technique has been applied, the symbol estimates generated at the receiver may have a substantially uniform noise level, such that the resulting FEC-encoded bit estimates have a substantially uniform BER, which may be denoted $BER_{NOISE\_AVG}$. In contrast to $BER_{FEC\_AVG}$, which is determined by directly averaging $BER_A$ and $BER_B$, $BER_{NOISE\_AVG}$ is determined using the relationship between BER and symbol noise for the specific modulation scheme being used. For example, FIG. 5 illustrates a magnified portion of the plot illustrated in FIG. 4, with example points A and B denoting two sets of symbol estimates having two different noise levels which are associated with $BER_A$ and $BER_B$, respectively. As illustrated in FIG. 5, a calculation of $BER_{FEC\_AVG}$ may be represented schematically by drawing a straight line between points A and B on the curve, and then determining the BER that corresponds to the center point of that line. In contrast, $BER_{NOISE\_AVG}$ may be determined by first determining the average linear NSR associated with $BER_A$ and $BER_B$, and then using the curve to determine the BER that corresponds to this average linear NSR. It is apparent from the magnified plot of FIG. 5, that $BER_{NOISE\_AVG}$ is less than $BER_{FEC\_AVG}$. In other words, performing an operation that averages the noise across the two sets of symbols will result in a uniform BER ($BER_{NOISE\_AVG}$) that is less than the average BER that the FEC scheme would be responding to ($BER_{FEC\_AVG}$) if the noise averaging operation is not performed.

It may be of interest to ensure that the bit estimates undergoing FEC decoding have a BER that is as low as possible, so as to reduce the likelihood that the FEC decoding will fail, or to permit the use of a higher rate FEC scheme that requires less overhead. Accordingly, for the example points A and B in FIG. 5, it may be of interest to implement a noise averaging technique so that the FEC decoding only needs to respond to the lower value of $BER_{NOISE\_AVG}$, instead of the higher value of $BER_{FEC\_AVG}$ that the FEC decoding would need to handle in the absence of noise averaging.

However, there are other examples in which it may be of interest for the FEC decoding to handle bit estimates having a range of BERs, such that the FEC responds to $BER_{FEC\_AVG}$, rather than using noise averaging to generate a uniform value of $BER_{NOISE\_AVG}$. Referring to FIG. 5, $BER_{NOISE\_AVG}$ is less than $BER_{FEC\_AVG}$ because the points A and B are located in a convex region of the curve in FIG. 4. However, it may be shown that there are other points on the curve, specifically those located in the concave region of the curve in FIG. 4, for which $BER_{NOISE\_AVG}$ is greater than $BER_{FEC\_AVG}$.

Figure 6:
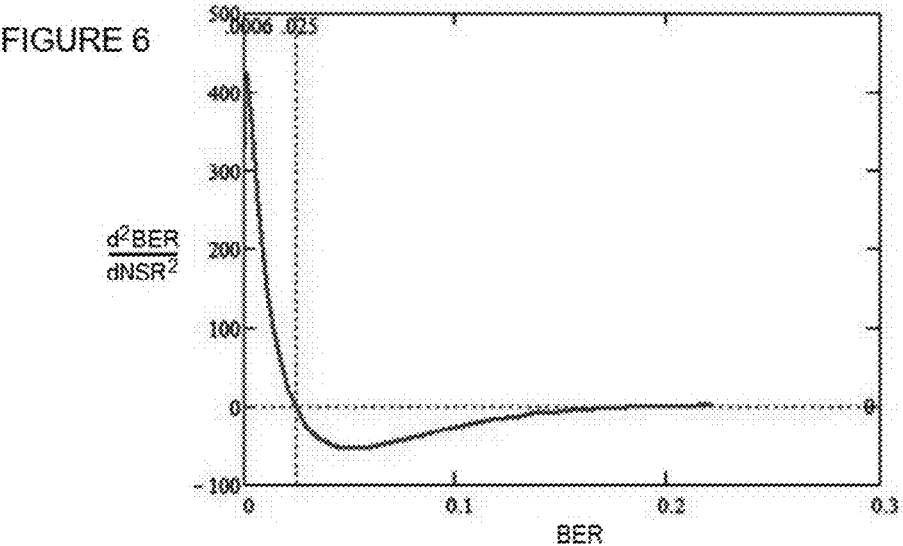
FIG. 6 illustrates the second derivative of the BER in FIG. 4 with respect to the NSR, plotted as a function of BER.

The convex and concave regions of the curve in FIG. 4 may be more easily distinguished from one another by considering the second derivative of BER with respect to linear NSR, which is plotted as a function of BER in FIG. 6. Those BER values for which the second derivative is positive correspond to the convex region of the curve in FIG. 4, whereas those BER values for which the second derivative is negative correspond to the concave region of the curve in FIG. 4. As is apparent from FIG. 6, BER values of less than 0.025 are within the convex region, whereas BER values of greater than 0.025 are within the concave region. Although not explicitly illustrated, it may be shown that, for two points located in the concave region (i.e., corresponding to two different BER values, each greater than 0.025), applying a noise averaging operation may result in a single uniform BER value, $BER_{NOISE\_AVG}$, that is greater than the value of $BER_{FEC\_AVG}$ for the two points. This is one example in which it may be preferable to let the FEC respond to $BER_{FEC\_AVG}$, rather than using noise averaging.

The choice of whether to perform noise averaging may depend on the different noise levels (and BERs) in question.

In U.S. patent application Ser. No. 15/672,434 filed on Aug. 9, 2017, Oveis-Gharan et al. describe a technique referred to as contrast coding, in which noise is redistributed to generate different classes of bit estimates, where each class may be associated with a different average BER. Within a given class, polarization-dependent and/or frequency-dependent effects may produce a range of BER values. The choice of whether to let the FEC decoding handle the range of BER values, or whether to instead perform a noise averaging operation may depend on the average BER of the class. For example, a low-BER class may include a range of BER values located within the convex portion of the curve in FIG. 4. In this case, it may be advantageous to handle the range of BER values by using a noise averaging operation to obtain a substantially uniform BER value within the class. In another example, a high-BER class may include a range of BER values located within the concave portion of the curve in FIG. 4. In this case, it may be advantageous to let the FEC decoding respond directly to the range of BER values within the class.

In U.S. patent application Ser. No. 16/003,736 filed on Jun. 8, 2018, Khandani et al. describe a technique whereby a dimensional transformation is applied at a transmitter in order to increase the number of dimensions over which each multi-bit symbol is represented during transmission to a receiver. As previously noted, the dimensions at a particular timeslot, t, are denoted as XI(t), XQ(t), YI(t), and YQ(t). Application of the dimensional transformation may result in each symbol being represented by dimensions that are distributed over two or more timeslots. At the receiver, an inverse dimensional transformation is applied in order to decrease the dimensionality of the symbols and facilitate soft-decoding. Application of the dimensional transformation and corresponding inverse dimensional transformation may be used to average signal degradations across a plurality of signal dimensions, including degradations caused by one or more of noise, nonlinear effects, PDL, and analog imperfections.

A dimensional transformation may be used to address signal degradations within a single frequency band. Alternatively, or additionally, it may be of interest to address frequency-dependent degradations. For example, due to filtering effects or laser interference, a first FDM channel may be significantly more degraded than a second FDM channel. As a result of this frequency-dependent degradation, the BER of the bits that are transmitted over the first FDM channel may be higher than the BER of the bits that are transmitted over the second FDM channel. As described previously, the choice of whether to let FEC decoding handle the range of BER values caused by frequency-dependent degradations, or whether to instead perform a noise averaging operation, may depend on the range of BER values in question. Referring to FIG. 4, if the range of BER values is located within the convex portion of the curve, it may be advantageous to use a noise averaging operation to obtain a substantially uniform BER value prior to FEC decoding. If the range of BER values is located within the concave portion of the curve, it may be advantageous to let the FEC decoding respond directly to the range of BER values, or indeed increase the range of BER values.

Where frequency-dependent degradations across FDM channels result in a range of BER values, it may be of interest to equalize these BER values. This equalization or averaging may be achieved by reducing the number of FDM channels observed by the streams of symbols. There are other examples in which it may be of interest to increase the number of FDM channels observed by the streams of symbols. In general, supporting a variable number of FDM channels has been shown to be beneficial in terms of reducing nonlinear power for different fiber applications. As described by Poggiolini et al., the optimum number of FDM channels may be a function of the amount of dispersion on the optical fiber. Thus, larger numbers of FDM channels (e.g., 4, 8, etc.) may be suitable for high-dispersion links, while smaller numbers of FDM channels (e.g., 1 or 2) may be suitable for low-dispersion links.

Conventional methods for supporting a variable number of FDM channels are challenging and complex to implement. Implementation in the frequency domain involves designing a variable-sized FFT structure, while implementation in the time domain involves applying a bank of filters for different FDM channels corresponding to RC pulse-shapes with different frequency centers and combining the filter outputs. Such banks of filters may be programmable to support a different number of FDM channels, which may add significant area and/or heat cost to the design. Convention methods for supporting a variable number of FDM channels may also result in sensitivity to laser linewidth for a large number of channels.

As will be described in more detail with respect to specific examples, a technique herein referred to as pseudo frequency division multiplexing (pFDM) may be used to support a variable number of effective FDM channels, herein referred to as pFDM channels. pFDM may provide an arbitrary number of pFDM channels, while avoiding the complexities involved in the design of variable FDM.

For the purposes of the following examples, the term "pFDM transformation" may be understood as an operation that results in transformed digital drive signals that are used at a transmitter to modulate dimensions of one or more FDM subcarriers to represent multi-bit symbols. The pFDM transformation may be designed to generate a variable number of pFDM channels. According to some examples, the pFDM transformation may be designed to generate a number of pFDM channels that is less than the actual number of FDM channels. For example, given N=4 orthogonal FDM channels, a pFDM transformation may be applied across the four FDM channels at a single timeslot in order to generate a single pFDM channel. Instead of each one of four streams of symbols experiencing a different level of frequency-dependent degradation corresponding to the respective FDM channel over which the stream is transmitted, the pFDM transformation causes the frequency-dependent degradations to be averaged, such that all symbol streams are effectively transmitted over a single pFDM channel that exhibits a uniform amount of degradation. According to other examples, the pFDM transformation may be designed to generate a number of pFDM channels that is greater than the actual number of FDM channels. For example, a pFDM transformation may be applied within a single FDM channel across four timeslots in order to generate four pFDM channels. The timeslots may be consecutive or non-consecutive. Instead of a single stream of symbols experiencing the same amount of degradation, the pFDM transformation generates four streams of symbols, where each stream experiences a different level of frequency-dependent degradation corresponding to the respective pFDM channel over which the stream is transmitted.

According to some examples, the transformed digital drive signals are generated as a result of applying the pFDM transformation to preliminary digital drive signals, the preliminary digital drive signals having been designed to modulate dimensions of one or more FDM subcarriers to represent multi-bit symbols according to a specific modulation scheme.

The pFDM transformation may be implemented as one or more serial steps, as one or more parallel steps, or as a combination of both serial and parallel steps. In some examples, the pFDM transformation may comprise the application of a matrix transformation. For example, digital signals corresponding to dimensions of one or more FDM subcarriers may undergo matrix multiplication as part of the pFDM transformation. The matrix transformation may be linear or substantially linear. The matrix transformation may be unitary or substantially unitary. That is, the inverse of the matrix transformation may be equal to or substantially equal to the complex conjugate transpose of the matrix transformation. In some examples, the linear operation based on matrix multiplication may be replaced by other forms of linear filtering. In some examples, the pFDM transformation may comprise using preliminary digital signals to determine corresponding transformed digital signals based on information stored in a database, such as a look-up table (LUT).

For the purposes of the following examples, the term "inverse pFDM transformation" may be understood as an operation which is applied to received digital signals, where the received digital signals correspond to dimensions of one or more FDM channels received at a receiver. Application of the inverse dimensional transformation may result in preliminary digital drive signal estimates, from which it possible to recover estimates of multi-bit symbols.

The inverse pFDM transformation may be implemented as one or more serial steps, as one or more parallel steps, or as a combination of both serial and parallel steps. In some examples, the inverse pFDM transformation may comprise the application of a matrix transformation. The matrix transformation may be linear or substantially linear. The matrix transformation may be unitary or substantially unitary. An advantage of using an inverse pFDM transformation that comprises a unitary matrix is that application of such a matrix does not enhance noise.

According to some examples, a pFDM transformation may be applied to preliminary digital drive signals at a transmitter, thereby generating transformed digital drive signals which are used to modulate one or more FDM subcarriers to generate an optical signal. The optical signal may be transmitted by the transmitter to a receiver. At the receiver, an inverse pFDM transformation may be applied to received digital signals, where the received digital signals correspond to dimensions of FDM subchannels of a degraded version of the optical signal that was transmitted by the transmitter. The inverse pFDM transformation may comprise an operation that is substantially the inverse of a pFDM transformation applied at a transmitter. For example, where the pFDM transformation comprises the application of a first matrix transformation, the inverse pFDM transformation may comprise the application of a second matrix transformation, where the second matrix transformation is substantially the inverse of the first matrix transformation. As a result of applying the inverse pFDM transformation to the received digital signals, preliminary digital drive signal estimates may be determined at the receiver. The preliminary digital drive signal estimates are estimates of the preliminary digital drive signals to which the pFDM transformation was applied at the transmitter.

As will be described in the specific examples that follow, the pFDM transformation and the inverse pFDM transformation may comprise additional operations, such as complex conjugate operations that are applied to a subset of signals, or signal interleaving.

The effect of a pFDM transformation is to introduce a partial correlation between multiple streams of symbols in order to achieve desired propagation properties, such as reduced degradations due to nonlinearity, improved tolerance to nonlinearity, and improved noise characteristics. The transmitted optical signal that results from a pFDM transformation comprises a plurality of information streams that are neither substantially dependent, nor substantially independent. The correlation introduced between the symbol streams may be used to change noise properties but without changing the relationship between spectral power and frequency.

The pFDM channels generated by the pFDM transformation are not orthogonal in the frequency domain. In the frequency domain, the pFDM channels partially overlap. That is, for a considerable portion of the frequency spectrum, neighbouring pFDM channels may coexist with relatively high signal power. This is in contrast to FDM transmission, wherein different FDM channels have zero overlap in frequency, and also to OFDM transmission, wherein different subcarriers provide zero energy (i.e., cross-talk) in the frequency tone corresponding to other subcarriers. Relaxing the frequency-domain orthogonality simplifies the design by no longer requiring banks of a variable number of programmable filters in the time domain, as required for conventional methods of supporting a variable number of FDM channels. By inverting the transformation in the receiver, the channel linear distortion will not break the orthogonality of the pFDM channels.

The remainder of this document provides example techniques for implementing a pFDM transformation at a transmitter and a corresponding inverse pFDM transformation at a receiver. In the following examples, the pFDM transformation is applied by a DSP of a transmitter, such as the transmit DSP 214 of the transmitter 200. The inverse pFDM transformation is applied by a DSP of a receiver, such as the receiver DSP 314 of the receiver 300.

Example 1: Reducing the Effective Number of FDM Channels

According to a first example, a pFDM transformation implemented at a transmitter comprises a matrix transformation $H_1$ provided in Eq. 1.

$$H_1 \triangleq \begin{pmatrix} h_{1,1} & h_{1,2} & \ldots & h_{1,N} \\ h_{2,1} & h_{2,2} & \ldots & h_{2,N} \\ \ldots & \ldots & \ldots & \ldots \\ h_{N,1} & h_{N,2} & \ldots & h_{N,N} \end{pmatrix}, h_{m,n} \triangleq e^{-\frac{j2\pi(n-1)\left(m-\frac{N+1}{2}\right)}{N}} \quad (1)$$

for m=1 . . . N and n=1 . . . N, and where N denotes a number of FDM channels to which the pFDM transformation is being applied.

The matrix transformation $H_1$ is a unitary matrix similar to the Discrete Fourier Transform (DFT) matrix, except that the frequency indices $$\left(m - \frac{N+1}{2}\right)$$

are shifted by 0.5 to non-integer values. This half-integer shift provides a benefit over the DFT matrix as each row of the matrix transformation $H_1$ provides a complex sinusoidal vector with a frequency equal to the negative of the center frequency of the corresponding FDM channel.

The matrix transformation $H_1$ may be applied to N sets of preliminary digital drive signals at a particular timeslot, t, denoted K (t), for K=1 . . . N, where each set of preliminary digital drive signals is designed to modulate a respective FDM optical subcarrier to represent a respective multi-bit symbol at the particular timeslot, t.

Application of the matrix transformation $H_1$ to the N sets of preliminary digital drive signals $S_K(t)$ results in N sets of transformed digital drive signals, denoted $S_K(t)$, for K= 1 . . . N. This is shown in Eq. 2.

$$\begin{pmatrix} S_1(t) \\ S_2(t) \\ \dots \\ S_N(t) \end{pmatrix} = H_1 \begin{pmatrix} \hat{S}_1(t) \\ \hat{S}_2(t) \\ \dots \\ \hat{S}_N(t) \end{pmatrix} \quad (2)$$

One may consider an example in which N=4. In this case, there would be four sets of preliminary digital drive signals, denoted $\hat{S}_1(t), \hat{S}_2(t), \hat{S}_3(t), \hat{S}_4(t)$, respectively, corresponding to the four FDM channels. The matrix transformation $H_1$ would be a 4×4 matrix. Application of the matrix transformation $H_1$ would result in four sets of transformed digital drive signals, $S_1(t), S_2(t), S_3(t), S_4(t)$, respectively, where each set of transformed digital drive signals is determined from a respective combination of the four sets of preliminary digital drive signals. The nature of the combination is determined from the values in the matrix transformation $H_1$. For example, the set of transformed digital drive signals $S_1(t)$ may be calculated as shown in Eq. 3.

$$S_1(t) = h_{1,1}\hat{S}_1(t) + h_{1,2}\hat{S}_2(t) + h_{1,3}\hat{S}_3(t) + h_{1,4}\hat{S}_4(t) \quad (3)$$
$$= \hat{S}_1(t) + e^{\frac{3\pi}{4}j}\hat{S}_2(t) + e^{\frac{6\pi}{4}j}\hat{S}_3(t) + e^{\frac{9\pi}{4}j}\hat{S}_4(t)$$

According to the first example, an inverse pFDM transformation implemented at a receiver comprises an inverse matrix transformation $H_1^{-1}$ provided in Eq. 4.

$$H_1^{-1} \triangleq \begin{pmatrix} h_{1,1} & h_{1,2} & \dots & h_{1,N} \\ h_{2,1} & h_{2,2} & \dots & h_{2,N} \\ \dots & \dots & \dots & \dots \\ h_{N,1} & h_{N,2} & \dots & h_{N,N} \end{pmatrix}, h_{m,n} \triangleq e^{\frac{j2\pi(n-1)\left(m-\frac{N+1}{2}\right)}{N}} \quad (4)$$

for m=1 . . . N and n=1 . . . N.

The inverse matrix transformation $H_1^{-1}$ may be applied to N sets of received signals at a particular timeslot, t, denoted $R_K(t)$, for K=1 . . . N, where each set of received signals corresponds to a respective FDM channel at the particular timeslot, t.

Application of the inverse matrix transformation $H_1^{-1}$ to the N sets of received signals results in preliminary digital drive signal estimates, denoted $\hat{R}_K(t)$, for K=1 . . . N. This is shown in Eq. 5.

$$\begin{pmatrix} \hat{R}_1(t) \\ \hat{R}_2(t) \\ \dots \\ \hat{R}_N(t) \end{pmatrix} = H_1^{-1} \begin{pmatrix} R_1(t) \\ R_2(t) \\ \dots \\ R_N(t) \end{pmatrix} \quad (5)$$

In the example where N=4, there would be four sets of received digital signals, denoted $R_1(t), R_2(t), R_3(t), R_4(t)$, respectively, corresponding to the four FDM channels. The inverse matrix transformation $H_1^{-1}$ would be a 4×4 matrix. Application of the inverse matrix transformation $H_1^{-1}$ would result in four sets of preliminary digital drive signal estimates, $\hat{R}_1(t), \hat{R}_2(t), \hat{R}_3(t), \hat{R}_4(t)$, respectively, where each set of preliminary digital drive signal estimates is determined from a respective combination of the four sets of received digital signals. The nature of the combination is determined from the values in the inverse matrix transformation $H_1^{-1}$. For example, the set of preliminary digital drive signal estimates $\hat{R}_2(t)$ may be calculated as shown in Eq. 6.

$$\hat{R}_2(t) = h_{2,1}R_1(t) + h_{2,2}R_2(t) + h_{2,3}R_3(t) + h_{2,4}R_4(t) \quad (6)$$
$$= e^{\frac{-j3\pi}{4}}R_1(t) + e^{\frac{-j\pi}{4}}R_2(t) + e^{\frac{j\pi}{4}}R_3(t) + e^{\frac{j3\pi}{4}}R_4(t)$$

It may be verified that data of different FDM channels are scrambled together in time such that data of the $K^{th}$ FDM channel $\hat{S}_K(1), \hat{S}_K(2), \hat{S}_K(3), \dots$ can be generated by decimating the time-domain signal by N (that is, taking every $N^{th}$ sample). This means that the N FDM channels are orthogonal to each other in the time domain and the aggregate channel behaves as a single effective FDM channel.

Figure 7:
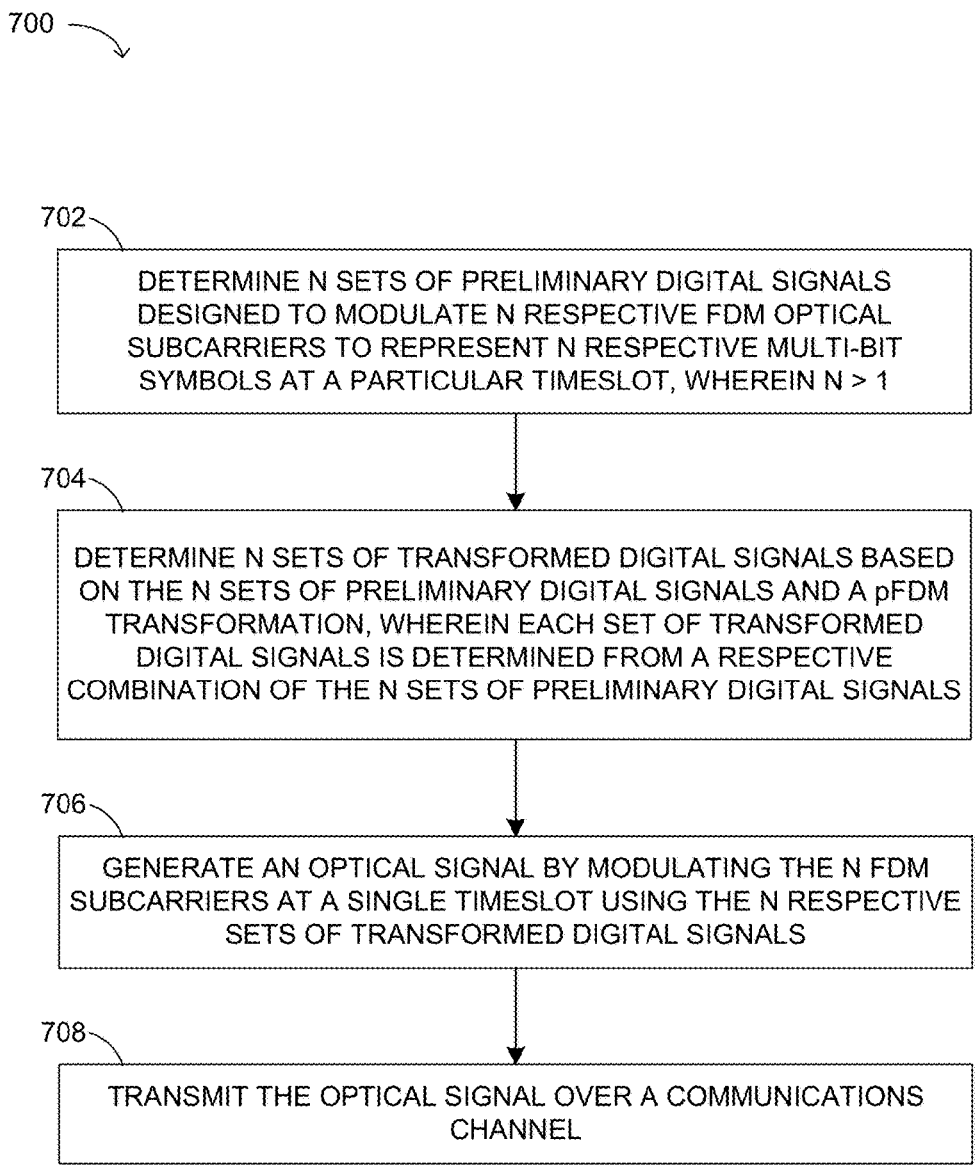
FIG. 7 illustrates a method for implementing a pseudo frequency division multiplexing (pFDM) transformation at a transmitter according to a first example.

FIG. 7 illustrates an example method 700 for implementing a pFDM transformation at a transmitter, such as the transmitter 200. The method 700 may be implemented by a DSP of the transmitter, such as the transmit DSP 214.

At 702, based on a specific modulation scheme, the transmitter may determine N sets of preliminary digital drive signals, where N>1. The N sets may be designed to modulate the dimensions of N respective FDM subcarriers of an optical carrier in order to represent N respective multi-bit symbols at a particular timeslot.

At 704, the transmitter may determine N sets of transformed digital drive signals based on the N sets of preliminary digital drive signals determined at 702 and a pFDM transformation. Each set of transformed digital drive signals may be determined from a respective combination of the N sets of preliminary digital drive signals, where each respective combination may be determined from the pFDM transformation. In general, the pFDM transformation may be applied to a plurality of symbols from each FDM subcarrier. In one example, the transmitter may generate the transformed digital drive signals by applying the pFDM transformation directly to the preliminary digital drive signals determined at 702. In another example, the transmitter may generate the transformed digital drive signals by applying the pFDM transformation to digital signals that are based on the preliminary digital drive signals determined at 702. In another example, the transmitter may determine the transformed digital drive signals using a LUT corresponding to the pFDM transformation.

At 706, the transmitter may generate an optical signal by modulating the N FDM subcarriers at a single timeslot using the N respective sets of transformed digital drive signals that were determined at 704. Thus, instead of the optical signal being generated using the preliminary digital drive signals, the optical signal is generated using the transformed digital drive signals.

At 708, the transmitter may transmit the optical signal over a communications channel. As a result of the N FDM subcarriers having been modulated using the N respective sets of transformed digital drive signals, streams of symbols that would have experienced the effects of four different FDM channels are scrambled in time such that the streams experience the effects of a single pFDM channel. In this manner, any frequency-dependent effects associated with the different FDM channels may be averaged out such that all symbol streams experience substantially the same effects.

Figure 8:
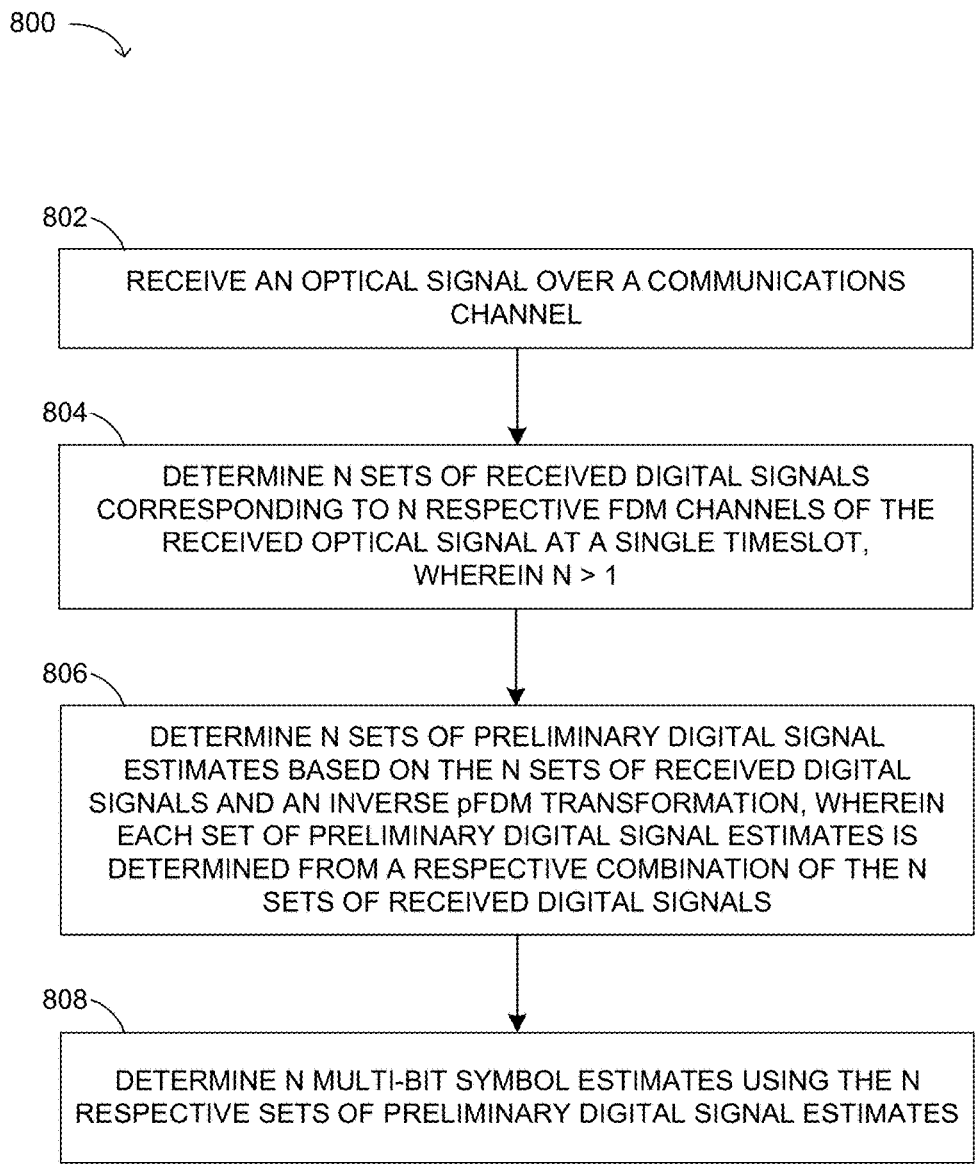
FIG. 8 illustrates a method for implementing an inverse pFDM transformation at a receiver according to the first example.

FIG. 8 illustrates an example method 800 for implementing an inverse pFDM transformation at a receiver, such as the receiver 300. The method 800 may be implemented by a DSP of the receiver, such as the receive DSP 314.

At 802, the receiver may receive an optical signal. The received optical signal may be representative of multi-bit symbols. According to some examples, the received optical signal may comprise a degraded version of an optical signal generated at a transmitter according to the method 700.

At 804, the receiver may determine N sets of digital signals corresponding to N respective FDM channels of the received optical signal at a single timeslot, where N>1.

At 806, the receiver may determine N sets of preliminary digital drive signal estimates based on the N sets of received digital signals determined at 804 and an inverse pFDM transformation. Each set of preliminary digital drive signal estimates may be determined from a respective combination of the N sets of received digital signals, where each respective combination may be determined from the inverse pFDM transformation. In one example, the receiver may generate the preliminary digital drive signal estimates by applying the inverse pFDM transformation directly to the received digital signals determined at 804. In another example, the receiver may generate the preliminary digital drive signal estimates by applying the inverse pFDM transformation to digital signals that are based on the received digital signals determined at 804. Where the inverse pFDM transformation is substantially the inverse of a pFDM transformation that was applied at a transmitter at 704, the preliminary digital drive signal estimates may be estimates of the preliminary digital drive signals that were determined at 702.

At 808, the receiver determines N multi-bit symbol estimates using the respective N sets of preliminary digital drive signal estimates determined at 806. Each symbol estimate determined at 808 may subsequently undergo symbol-to-bit demapping, such as that denoted by 310 in FIG. 3, in order to recover corresponding bit estimates. Where the symbols are comprised of FEC-encoded bits, the bit estimates may subsequently undergo FEC decoding, such as that denoted by 306 in FIG. 3, thereby generating corrected client data bits.

The method 700 and the method 800 may be separately applied to multiple groups of FDM channels. For example, a first plurality of FDM channels may be used to generate a first pFDM channel according to the method 700, and a second plurality of FDM channels may be used to generate a second pFDM channel according to the method 700. Where the first plurality of FDM channels is distinct from the second plurality of FDM channels, the first and second pFDM channels will be orthogonal to each other and non-overlapping in the frequency domain.

A smaller number of pFDM channels may be advantageous for links with high laser linewidth as well as links with narrow optical filters. A smaller number of pFDM channels may also provide better carrier phase recovery performance against larger number of FDM channels. This feature would be useful for links with intensity-modulation and direct-detection (IMDD) interferers or with compensated Enhanced Large Effective Area Fiber (ELEAF) dispersion maps.

A greater number of pFDM channels may result in a non-linear benefit for high net dispersion submarine links. A greater number of pFDM channels may also reduce the impact of equalization enhanced phase noise (EEPN), in which laser phase noise is converted to amplitude noise through electronic dispersion compensation, where EEPN is proportional to subcarrier symbol rate.

Example 2: Increasing the Effective Number of FDM Channels

According to a second example, a pFDM transformation implemented at a transmitter comprises a matrix transformation $H_2$ provided in Eq. 7.

$$H_2 \triangleq \begin{pmatrix} h_{1,1} & h_{1,2} & \ldots & h_{1,N} \\ h_{2,1} & h_{2,2} & \ldots & h_{2,N} \\ \ldots & \ldots & \ldots & \ldots \\ h_{N,1} & h_{N,2} & \ldots & h_{N,N} \end{pmatrix}, h_{m,n} \triangleq e^{\frac{j2\pi(n-1)\left(m-\frac{N+1}{2}\right)}{N}} \quad (7)$$

for m=1 . . . N and n=1 . . . N, and where N denotes a number of timeslots over which the pFDM transformation is being applied.

As in the first example, the matrix transformation $H_2$ is a unitary matrix similar to the DFT matrix, except that the frequency indices $$\left(n - \frac{N+1}{2}\right)$$

are shifted by 0.5 to noninteger values. This half-integer shift provides a benefit over the DFT matrix, as it guarantees that the centers of the pFDM channels are uniformly spaced and spread over the entire bandwidth of the signal.

Rather than the applying the matrix transformation $H_2$ across N FDM channels, as was done in the first example, the matrix transformation $H_2$ in the second example is applied across N consecutive timeslots within each FDM channel. Thus, for the $K^{th}$ FDM channel, the matrix transformation $H_2$ may be applied to N sets of preliminary digital drive signals, where the N sets of preliminary digital drive signals are designed to modulate the $K^{th}$ FDM optical subcarrier at N respective consecutive timeslots to represent a stream of multi-bit symbols.

Application of the matrix transformation $H_2$ to the N sets of preliminary digital drive signals $\hat{S}_K(t)$ corresponding the $K^{th}$ FDM channel results in N sets of transformed digital drive signals, denoted $S_K(t)$, for t=NL . . . NL+N−1, for all instances of an integer L. This is shown in Eq. 8.

$$\begin{pmatrix} S_K(NL) \\ S_K(NL+1) \\ \ldots \\ S_K(NL+N-1) \end{pmatrix} = H_2 \begin{pmatrix} \hat{S}_K(NL) \\ \hat{S}_K(NL+1) \\ \ldots \\ \hat{S}_K(NL+N-1) \end{pmatrix} \quad (8)$$

The effect of applying the matrix transformation $H_2$ across N consecutive timeslots within a single FDM channel is to generate N pFDM channels. Indeed, for a fixed value of p, the preliminary digital drive signals at timeslots t=p, p+N, p+2N, ..., that is $\hat{S}_K$(P, p+N, p+2N, ...), are up-sampled by N and modulated or convolved by a fixed complex sinusoidal frequency with a time-window length of N symbols. Equivalently, it is expected that the power spectrum of the preliminary digital drive signals $\hat{S}_K$(p, p+N, p+2N, ...) may be multiplied by a Sinc window with the center frequency of such a pFDM channel. Thus, the number of pFDM channels that are generated from the application of the matrix transformation $H_2$ is a factor of N greater than the number of FDM channels to which the matrix transformation $H_2$ is applied. For example, if the pFDM transformation $H_2$ is applied to each one of K=1 ... 4 FDM channels, across N consecutive timeslots, the result would be 4N pFDM channels.

One may consider an example in which N=4, and the matrix transformation $H_2$ is applied to the FDM channel K=1. In this case, there would be four sets of preliminary digital drive signals, denoted $\hat{S}_1(4L)$, $\hat{S}_1(4L+1)$, $\hat{S}_1(4L+2)$, $\hat{S}_1(4L+3)$, respectively, corresponding to four consecutive timeslots. The matrix transformation $H_2$ would be a 4×4 matrix. Application of the matrix transformation $H_2$ would result in four sets of transformed digital drive signals, $S_1(4L)$, $S_1(4L+1)$, $S_1(4L+2)$, $S_1(4L+3)$, respectively, where each set of transformed digital drive signals is determined from a respective combination of the four sets of preliminary digital drive signals. The nature of the combination is determined from the values in the matrix transformation $H_2$. For example, the set of transformed digital drive signals at timeslot t=4L+1, denoted $S_1(4L+1)$, may be calculated as shown in Eq. 9.

$$S_1(4L+1) = \tag{9}$$
$$h_{2,1}\hat{S}_1(4L) + h_{2,2}\hat{S}_1(4L+1) + h_{2,3}\hat{S}_1(4L+2) + h_{2,4}\hat{S}_1(4L+3) =$$
$$e^{\frac{-3\pi}{4}j}\hat{S}_1(4L) + e^{\frac{-\pi}{4}j}\hat{S}_1(4L+1) + e^{\frac{\pi}{4}j}\hat{S}_1(4L+2) + e^{\frac{3\pi}{4}j}\hat{S}_1(4L+3)$$

These calculations may be repeated for all instances of the integer L.

According to the second example, an inverse pFDM transformation implemented at a receiver comprises an inverse matrix transformation $H_2^{-1}$ provided in Eq. 10.

$$H_2^{-1} \triangleq \begin{pmatrix} h_{1,1} & h_{1,2} & \cdots & h_{1,N} \\ h_{2,1} & h_{2,2} & \cdots & h_{2,N} \\ \cdots & \cdots & \cdots & \cdots \\ h_{N,1} & h_{N,2} & \cdots & h_{N,N} \end{pmatrix}, h_{m,n} \triangleq e^{-\frac{j2\pi(n-1)(m-\frac{N+1}{2})}{N}} \tag{10}$$

for m=1 ... N and n=1 ... N.

Rather than the applying the inverse matrix transformation $H_2^{-1}$ across N FDM channels, as was done in the first example, in the second example the inverse matrix transformation $H_2^{-1}$ is applied across N consecutive timeslots within each FDM channel. Thus, for the $K^{th}$ FDM channel, the inverse matrix transformation $H_2^{-1}$ may be applied to N sets of received digital signals determined over a sequence of N respective consecutive timeslots.

Application of the inverse matrix transformation $H_2^{-1}$ to the N sets of received digital signals $R_K(t)$ corresponding to the $K^{th}$ FDM channel results in N sets of preliminary digital drive signal estimates, denoted $\hat{R}_K(t)$, for t=NL ... NL+N−1 and for all instances of an integer L. This is shown in Eq. 11.

$$\begin{pmatrix} \hat{R}_K(NL) \\ \hat{R}_K(NL+1) \\ \cdots \\ \hat{R}_K(NL+N-1) \end{pmatrix} = H_2^{-1} \begin{pmatrix} R_K(NL) \\ R_K(NL+1) \\ \cdots \\ R_K(NL+N-1) \end{pmatrix} \tag{11}$$

In the example where N=4 and the inverse matrix transformation $H_2^{-1}$ is applied to the FDM channel K=1, there would be four sets of received digital signals, denoted $R_1(4L)$, $R_1(4L+1)$, $R_1(4L+2)$, $R_1(4L+3)$, respectively, corresponding to four consecutive timeslots. The inverse matrix transformation $H_2^{-1}$ would be a 4×4 matrix. Application of the inverse matrix transformation $H_2^{-1}$ would result in four sets of preliminary digital drive signal estimates, $\hat{R}_1(4L)$, $\hat{R}_1(4L+1)$, $\hat{R}_1(4L+2)$, $\hat{R}_1(4L+3)$, respectively, where each set of preliminary digital drive signal estimates is determined from a respective combination of the four sets of received digital signals. The nature of the combination is determined from the values in the inverse matrix transformation $H_2^{-1}$. For example, the set of preliminary digital drive signal estimates at timeslot 4L+1, denoted $\hat{R}_2(4L+1)$, may be calculated as shown in Eq. 12.

$$\hat{R}_2(4L) = \tag{12}$$
$$h_{2,1}R_1(4L) + h_{2,2}R_1(4L+1) + h_{2,3}R_1(4L+2) + h_{2,4}R_1(4L+3) =$$
$$R_1(4L) + e^{\frac{j\pi}{4}}R_1(4L+1) + e^{\frac{j\pi}{2}}R_1(4L+2) + e^{\frac{j3\pi}{4}}R_1(4L+3)$$

Considering a sub-stream of the preliminary digital drive signals $\hat{S}_K(t)$ which is generated by symbols that are N symbols apart, such as $\hat{S}_K$(p, p+N, p+2N, ...), for a fixed value of p, the contribution of the sub-stream $\hat{S}_K(\{p+LN\}_{-\infty<L<\infty})$ into the transformed digital drive signals $S_K(t)$ may be calculated by first up-sampling the sub-stream (that is, inserting N−1 zeros), followed by convolving the stream by a windowed complex sinusoidal function as shown in Eq. 13.

$$h_m(n) = \begin{cases} e^{\frac{j2\pi(n-1)(m-\frac{N+1}{2})}{N}} & \text{if } 0 \leq n < N \\ 0 & \text{otherwise} \end{cases} \tag{13}$$

The up-sampling operation in the time domain is equivalent to duplicating the spectrum in the frequency domain. Furthermore, convolving in time is equivalent to multiplying the up-sampled signal spectrum by the Fourier Transform of $h_m(n)$, which is a Sinc function with a center frequency of $$\left(m - \frac{N+1}{2}\right).$$

Figure 9:
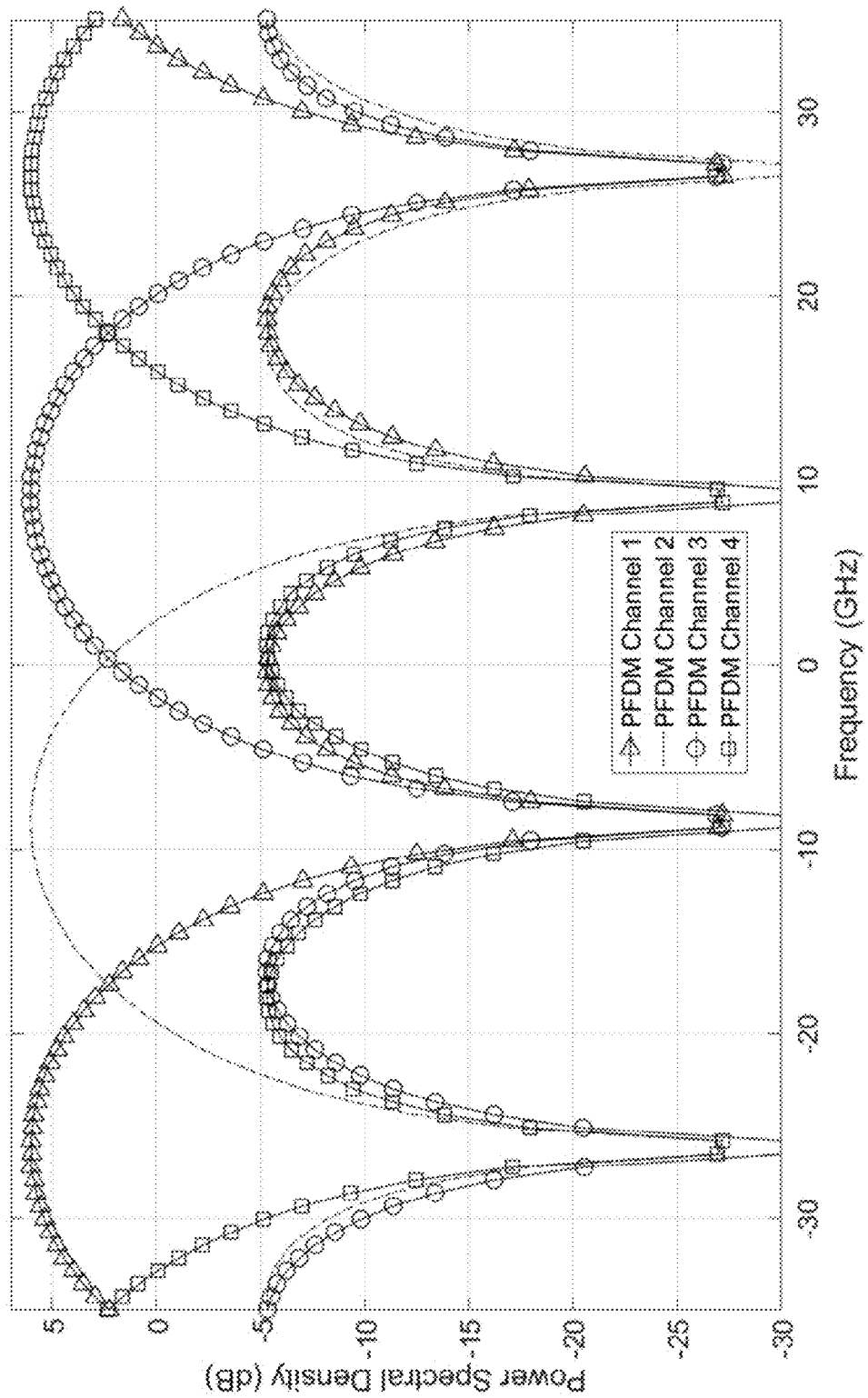
FIG. 9 is a plot of power spectral density as a function of frequency for each of four pFDM channels resulting from a pFDM transformation applied to a single FDM channel at a transmitter according to a second example.

This means that the N different sub-streams are shaped by frequency-domain Sinc windows and have a small overlap with each other in the frequency domain, as shown in FIG. 9.

In U.S. Pat. No. 7,522,841 entitled "Efficient Data Transmission and Training of Data Processing Functions" (2009), Bontu et al. describe a technique for conveying data through an optical communications system in which a received optical signal is oversampled to generate a multi-bit sample stream. Methods are described for organizing a serial symbol stream into bursts, and decoding half-bursts. Those methods may be applied to the pFDM methods described herein. According to other examples, streams may be detected in a round-robin fashion, considering one or two symbols from each stream in turn. Alternatively, each stream may be detected contiguously, in parallel.

FIG. 9 is a plot of power spectral density (dB) as a function of frequency (GHz) for each of four pFDM channels resulting from a pFDM transformation applied to a single FDM channel at a transmitter according to the second example.

In this example, the FDM channel occupies 70 GHz. The four pFDM channels resulting from the pFDM transformation are defined as follows:

pFDM channel 1: $\hat{S}(0), \hat{S}(4), \hat{S}(8), \ldots$
pFDM channel 2: $\hat{S}(1), \hat{S}(5), \hat{S}(9), \ldots$
pFDM channel 3: $\hat{S}(2), \hat{S}(6), \hat{S}(10), \ldots$
pFDM channel 4: $\hat{S}(3), \hat{S}(7), \hat{S}(11), \ldots$ Each pFDM channel is generated from s sub-streams of $\hat{S}$. In general, pFDM channel m is generated from $\hat{S}(m, m+N, m+2N, \ldots)$. In order to generate the power spectral density for each pFDM channel, zero symbols may be sent through other sub-streams. As an example, in order to generate pFDM channel m, a signal $\tilde{S}(n)$ may be transmitted, where $\tilde{S}(n)$ is shown in Eq. 14.

$$\tilde{S}(n) := \begin{cases} \hat{S}(n) & \text{if } n-m \text{ is a multiple of } N \\ 0 & \text{otherwise} \end{cases} \quad (14)$$

After applying the pFDM transformation to the signal $\tilde{S}(n)$, the power spectral density of the output of the pFDM transformation may be calculated. The power spectral density for the $m^{th}$ FDM channel is shown in FIG. 9.

Similarly to the original FDM channel, each of the four pFDM channels also occupies 70 GHz. That is, the pFDM channels have equal bandwidths. The four pFDM channels have power spectral peaks in frequency which are uniformly spaced with respect to each other, such that the data of each pFDM channel is mostly contained in a small portion of the entire band. However, the power spectra of the four pFDM channels have considerable overlap with each other. Indeed, the −3 dB frequency points of neighbouring FDM channels intersect with each other. Furthermore, pFDM channels 2 and 3 coexist for almost the entire spectrum. This is in contrast to FDM transmission, wherein different FDM channels are non-overlapping in the frequency domain. Furthermore, in contrast to OFDM transmission, wherein different subcarriers provide no cross-talk, the four pFDM channels generated by the pFDM transformation are not orthogonal. Hence, it is expected that the pFDM transformation may achieve nonlinear benefits due to multiple FDM signaling for high dispersion links. Furthermore, similarly to multi-FDM systems, the pFDM transformation may avoid the phase noise to amplitude noise conversion which is incurred in single-FDM systems when experiencing high levels of fiber chromatic dispersion.

Figure 10:
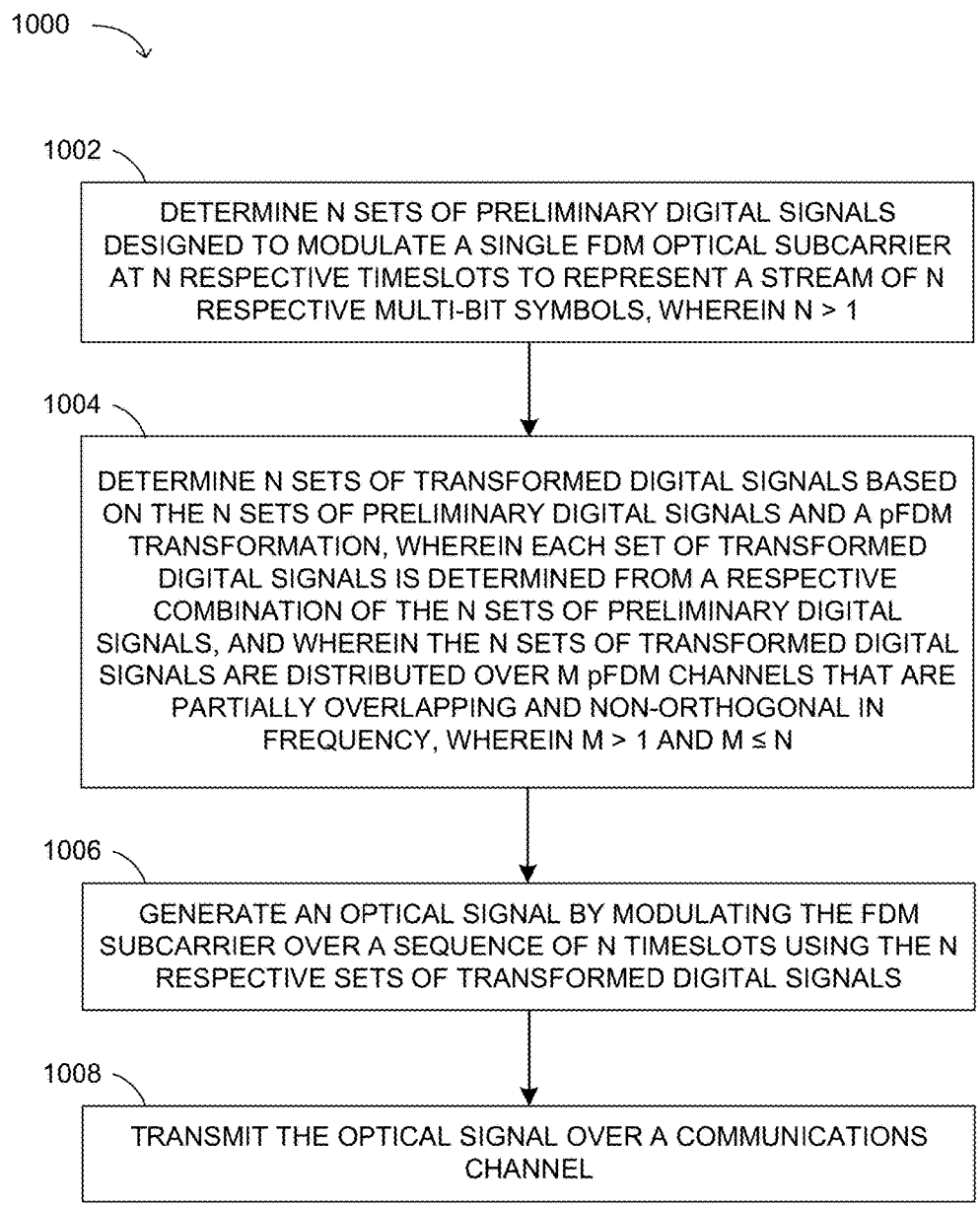
FIG. 10 illustrates a method for implementing a pFDM transformation at a transmitter according to the second example.

FIG. 10 illustrates an example method 1000 for implementing a pFDM transformation at a transmitter, such as the transmitter 200. The method 1000 may be implemented by a DSP of the transmitter, such as the transmit DSP 214. The method 1000 is described with respect to a single FDM channel, but may be implemented for multiple FDM channels.

At 1002, based on a specific modulation scheme, the transmitter may determine N sets of preliminary digital drive signals, where N>1. The N sets may be designed to modulate the dimensions of a single FDM subcarrier at N respective timeslots in order to represent N respective multi-bit symbols. For simplicity, Example 2 involved consecutive timeslots. However, the timeslots may alternatively be non-consecutive.

At 1004, the transmitter may determine N sets of transformed digital drive signals based on the N sets of preliminary digital drive signals determined at 1002 and a pFDM transformation. Each set of transformed digital drive signals may be determined from a respective combination of the N sets of preliminary digital drive signals, where each respective combination may be determined from the pFDM transformation. In one example, the transmitter may generate the transformed digital drive signals by applying the pFDM transformation directly to the preliminary digital drive signals determined at 1002. In another example, the transmitter may generate the transformed digital drive signals by applying the pFDM transformation to digital signals that are based on the preliminary digital drive signals determined at 1002. In another example, the transmitter may determine the transformed digital drive signals using a LUT corresponding to the pFDM transformation.

At 1006, the transmitter may generate an optical signal by modulating the FDM subcarrier over a sequence of N timeslots using the N respective sets of transformed digital drive signals that were determined at 1004. Thus, instead of the optical signal being generated using the preliminary digital drive signals, the optical signal is generated using the transformed digital drive signals.

At 1008, the transmitter may transmit the optical signal over a communications channel. As a result of the FDM subcarrier having been modulated using the N respective sets of transformed digital drive signals, symbols that would have experienced the effect of a single FDM channel are now distributed over M pFDM channels, where M>1, and M≤N. The frequency spectra of the M pFDM channels partially overlap with one another and are not orthogonal. In the presence of frequency-dependent degradations, different symbols may be impacted differently. In Example 2, the number M of pFDM channels is equal to the number N of sets of transformed digital drive signals. However, as will be described with respect to Example 4, the number M of pFDM channels may alternatively be less than the number N of sets of transformed digital drive signals.

Figure 11:
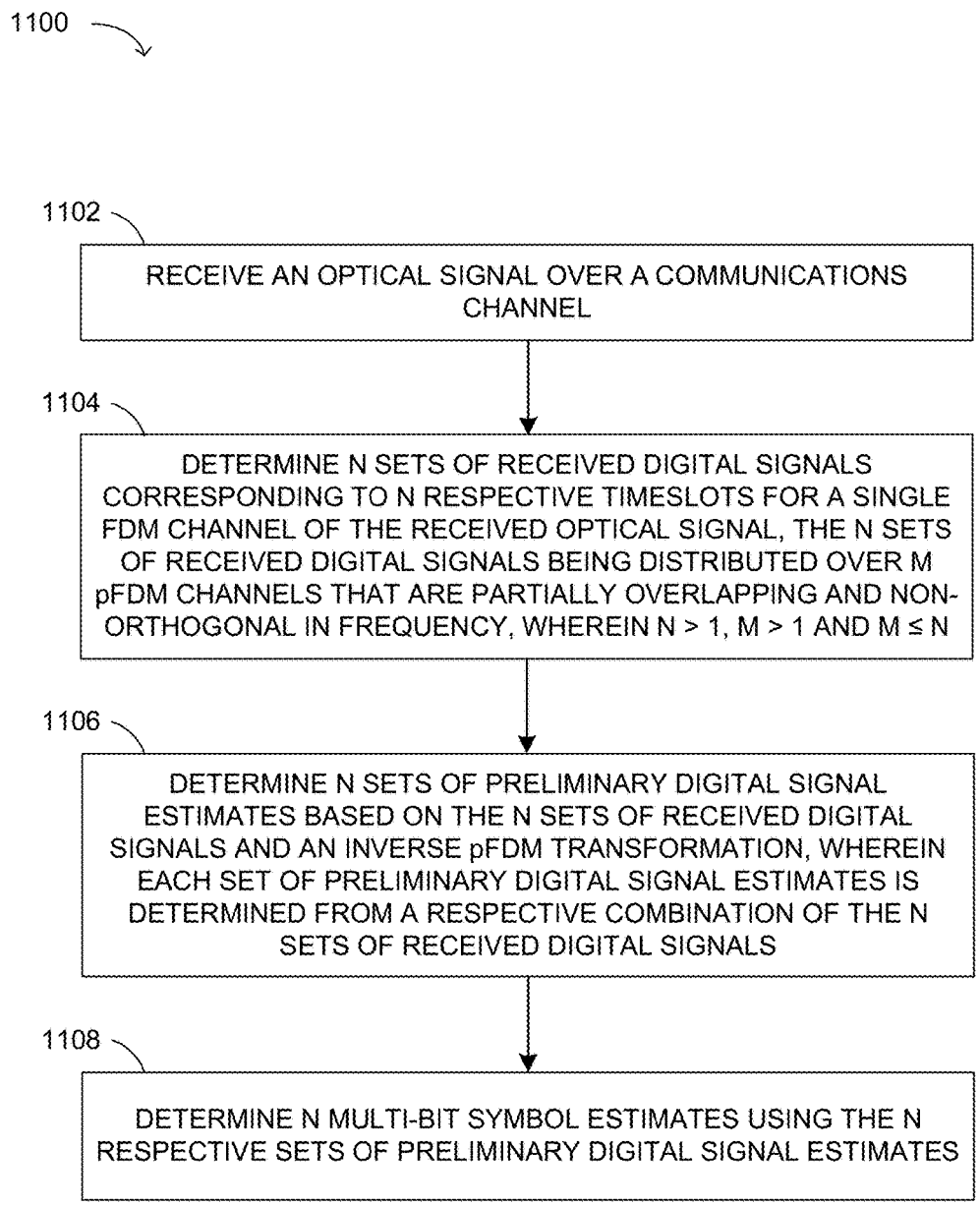
FIG. 11 illustrates a method for implementing an inverse pFDM transformation at a receiver according to the second example.

FIG. 11 illustrates an example method 1100 for implementing an inverse pFDM transformation at a receiver, such as the receiver 300. The method 1100 may be implemented by a DSP of the receiver, such as the receive DSP 314. The method 1100 is described with respect to a single FDM channel, but may be implemented for multiple FDM channels.

At 1102, the receiver may receive an optical signal. The received optical signal may be representative of multi-bit symbols. According to some examples, the received optical signal may comprise a degraded version of an optical signal generated at a transmitter according to the method 1000.

At 1104, the receiver may determine N sets of digital signals corresponding to N respective timeslots for a single FDM channel of the received optical signal, where N>1. As noted with respect to the method 1000 performed at the transmitter, the timeslots may be consecutive or non-consecutive.

At 1106, the receiver may determine N sets of preliminary digital drive signal estimates based on the N sets of received digital signals determined at 1104 and an inverse pFDM transformation. Each set of preliminary digital drive signal estimates may be determined from a respective combination of the N sets of received digital signals, where each respective combination may be determined from the inverse pFDM transformation. In one example, the receiver may generate the preliminary digital drive signal estimates by applying the inverse pFDM transformation directly to the received digital signals determined at 1104. In another example, the receiver may generate the preliminary digital drive signal estimates by applying the inverse pFDM transformation to digital signals that are based on the received digital signals determined at 1104. Where the inverse pFDM transformation is substantially the inverse of a pFDM transformation that was applied at a transmitter at 1004, the preliminary digital drive signal estimates may be estimates of the preliminary digital drive signals that were determined at 1002.

At 1108, the receiver may determine N multi-bit symbol estimates using the N respective sets of preliminary digital drive signal estimates as determined at 1106. The N multi-bit symbol estimates are estimates of multi-bit symbols that were distributed over M pFDM channels as a result of a pFDM transformation applied the transmitter, as described with respect to the method 1000, where M>1, and M≤N. As previously noted, the frequency spectra of the M pFDM channels partially overlap with one another and are not orthogonal. Each symbol estimate determined at 1108 may subsequently undergo symbol-to-bit demapping, such as that denoted by 310 in FIG. 3, in order to recover corresponding bit estimates. Where the symbols are comprised of FEC-encoded bits, the bit estimates may subsequently undergo FEC decoding, such as that denoted by 306 in FIG. 3, thereby generating corrected client data bits.

Example 3: pFDM with a Frequency Dependency

It may be of interest for a pFDM transformation to involve filtering of time-domain signals within each FDM channel prior to combining the data of different FDM channels. Returning to Example 1, filtered versions of the signals from different FDM channels may be combined as shown in Eq. 15.

$$S_m(t) := \sum_{n=1}^{N} \sum_{\tau=-T}^{T} h_{m,n}(\tau)\hat{S}_n(t-\tau) \tag{15}$$

where T denotes the number of one-sided taps of the filter $h_{m,n}(\tau)$ which is applied to the $n^{th}$ FDM channel prior to combining data from the different FDM channels, and where r denotes the index on the taps of the filter which ranges over the entire set of taps of the filter.

Hence, the pFDM matrix transformation $h_{m,n}(\tau)$ is a three-dimensional matrix of size N×N×(2T+1).

Applying time-domain filtering prior to combining data of different FDM channels is equivalent to applying a frequency-dependent pFDM transformation matrix in order to introduce frequency dependencies into the pFDM transformation. According to a third example, a pFDM transformation comprises a 4×4 matrix transformation $H_3$ provided in Eq. 16.

$$H_3(f) \triangleq \begin{pmatrix} H_{1,1}(f) & H_{1,2}(f) & H_{1,3}(f) & H_{1,4}(f) \\ H_{2,1}(f) & H_{2,2}(f) & H_{2,3}(f) & H_{2,4}(f) \\ H_{3,1}(f) & H_{3,2}(f) & H_{3,3}(f) & H_{3,4}(f) \\ H_{4,1}(f) & H_{4,2}(f) & H_{4,3}(f) & H_{4,4}(f) \end{pmatrix} \tag{16}$$

where f denotes frequency.

Thus, the matrix transformation $H_3$ comprises terms $H_{m,n}$ which are frequency-dependent. Using matrix multiplication, the matrix $H_3(f)$ may be applied to the frequency-domain data of different FDM channels, rather than being applied to the time-domain data. As an example, a DFT operation may be applied to time-domain data of each of the FDM channels as shown in Eq. 17, and the pFDM transformation may be applied to the frequency-domain data of different FDM channels as shown in Eq. 18.

$$1 \le f \le L: \hat{\Sigma}_n[f] := DFT\{\hat{S}_n(t)\}_{t=1...L} \tag{17}$$

for all instances of L.

$$\begin{pmatrix} \Sigma_1[f] \\ \Sigma_2[f] \\ \Sigma_3[f] \\ \Sigma_4[f] \end{pmatrix} = H_3(f) \cdot \begin{pmatrix} \hat{\Sigma}_1[f] \\ \hat{\Sigma}_2[f] \\ \hat{\Sigma}_3[f] \\ \hat{\Sigma}_4[f] \end{pmatrix} \tag{18}$$

The time-domain impulse response of the equivalent time-domain filters may be calculated from the frequency-domain pFDM three-dimensional matrices as shown in Eq. 19.

$$\forall t, 1 \le t \le L: h_{m,n}(t) := \text{IDFT}\{H_{m,n}(f)\}_{f=1...L} \tag{19}$$

where IDFT denotes the inverse DFT.

Accordingly, a pFDM transformation incorporating a frequency-dependent pFDM matrix may be applied either in the time domain through filtering of time-domain samples prior to combining data of different FDM channels, or in the frequency domain through multiplying frequency-domain data of different FDM channels by a frequency-dependent matrix.

Figure 12:
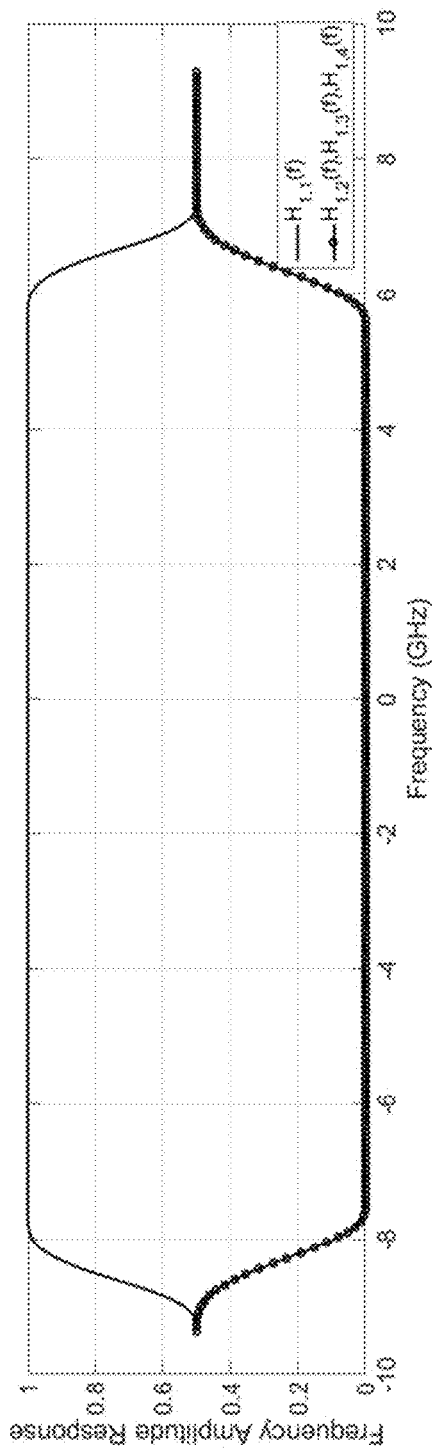
FIG. 12 is a plot of amplitude response as a function of frequency for each term of the pFDM transformation matrix according to a third example.
Figure 13:
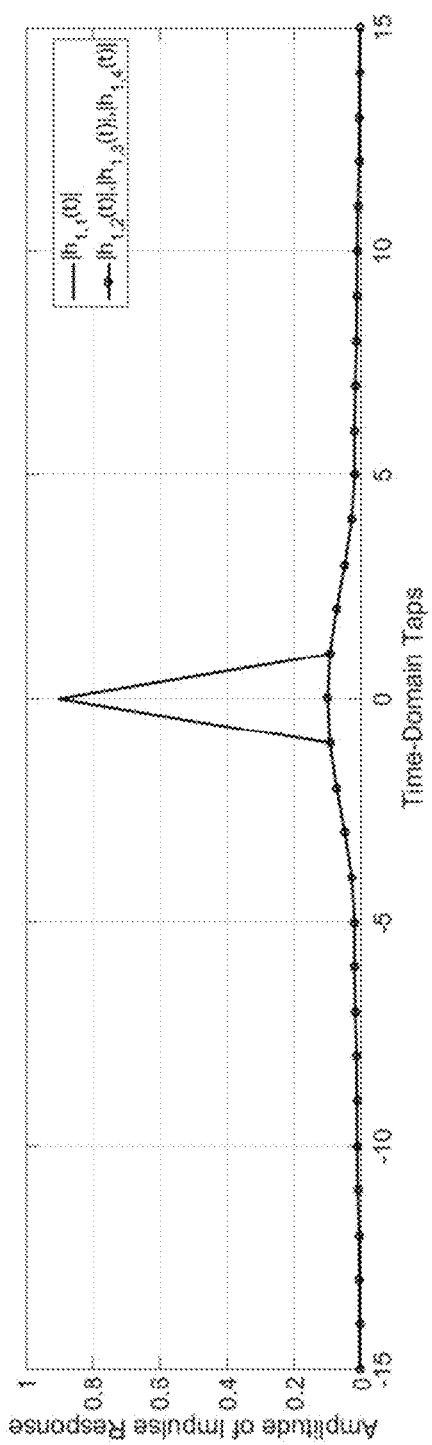
FIG. 13 is a plot of amplitude response as a function of time for each term of the pFDM transformation matrix according to the third example.

As illustrated in FIG. 12, the frequency amplitude response for the selected terms $H_{1,1}(f)$, $H_{1,2}(f)$, $H_{1,3}(f)$, and $H_{1,4}(f)$ may provide smooth transitions at the edges of the FDM frequency band. The smooth transitions in the frequency domain may be advantageous for constraining the time-domain impulse response of the equivalent time-domain filters. The amplitude of the time-domain impulse response of the equivalent time-domain filters as a function of time is provided in the plot of FIG. 13 for the selected terms $h_{1,1}(t)$, $h_{1,2}(t)$, $h_{1,3}(t)$, and $h_{1,4}(t)$.

Optical filters may introduce large frequency-specific degradations. This penalty resulting from these degradations may be dramatic when using certain FEC schemes. In United States Patent Application Publication No. 2017/0012704 entitled "Mitigation of Narrow-Band Degradations in a Broadband Communication System" (2017), Oveis Gharan et al. describe a method of mitigating narrow-band impairment imposed by an analog channel on a data signal within a bounded spectral region of a spectrum of the data signal.

It is contemplated that the pFDM technique may be used to help alleviate penalties arising from optical filtering, by limiting or avoiding the transmission of information on pFDM channels that coincide with problematic frequencies. For example, given four FDM channels, a pFDM transformation may be applied within each FDM channel to generate 8 pFDM channels, thereby resulting in a total of 32 pFDM channels. A tree code may be programmed such that the two outer pFDM channels transmit little or no information. In this manner, improvements in SNR may be achieved. However, the requirement for matrix multiplication using a large 8×8 matrix may increase the cost of applying pFDM. Furthermore, requiring very low-bandwidth pFDM channels may affect nonlinear performance and phase noise tracking capability significantly for terrestrial and metro links.

It may be of interest to enable different pFDM channels to have different bandwidths. For example, a very low bandwidth pFDM channel may be desirable for covering the edge frequencies of a FDM channel, whereas the remaining pFDM channels may have as wide a bandwidth as possible. According to some examples, the pFDM channels may have a range of bandwidths.

Example 4: Binary-Tree pFDM to Generate 4 Channels

According to a fourth example, a pFDM transformation implemented at a transmitter comprises a matrix transformation $H_4$ provided in Eq. 20.

$$H_4 \triangleq \begin{pmatrix} 1 & 1 \\ -1 & 1 \end{pmatrix} \quad (20)$$

As in the previous examples, the matrix transformation $H_4$ is a unitary matrix. However, in this example, the matrix transformation $H_4$ is applied three times in a recursive manner in order to obtain four pFDM channels.

Figure 14:
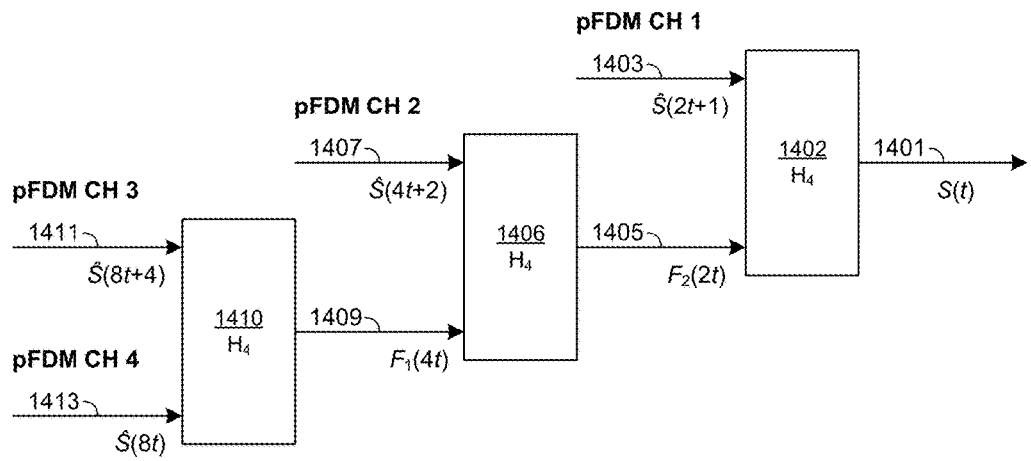
FIG. 14 is a schematic diagram illustrating the implementation of a pFDM transformation according to a fourth example.

FIG. 14 is a schematic diagram illustrating the implementation of the pFDM transformation according to the fourth example.

The transformed digital drive signals S(t), denoted by 1401, are generated by applying the matrix transformation $H_4$ at 1402 to two data streams 1403 and 1405, where 1403 denotes odd samples, $\hat{S}(2t+1)$, of the preliminary digital drive signals $\hat{S}(t)$, and where 1405 denotes a data stream $F_2(2t)$ that is a function of even samples of the preliminary digital drive signals $\hat{S}(t)$. The application of the matrix transformation $H_4$ at 1402 is shown in Eq. 21.

$$\begin{pmatrix} S(2t) \\ S(2t+1) \end{pmatrix} = H_4 \begin{pmatrix} F_2(2t) \\ \hat{S}(2t+1) \end{pmatrix} \quad (21)$$

The stream $F_2(2t)$, denoted by 1405, is recursively generated by applying the matrix transformation $H_4$ at 1406 to two data streams 1407 and 1409, where 1407 denotes even samples, $\hat{S}(4t+2)$, of the preliminary digital drive signals $\hat{S}(t)$, and where 1409 denotes a data stream $F_1(4t)$ that is a function of even samples of the preliminary digital drive signals $\hat{S}(t)$. The application of the matrix transformation $H_4$ at 1406 is shown in Eq. 22.

$$\begin{pmatrix} F_2(4t+2) \\ F_2(4t) \end{pmatrix} = H_4 \begin{pmatrix} \hat{S}(4t+2) \\ F_1(4t) \end{pmatrix} \quad (22)$$

The stream $F_1(4t)$, denoted by 1409, is recursively generated by applying the matrix transformation $H_4$ at 1410 to two data streams 1411 and 1413, where 1411 denotes even samples, $\hat{S}(8t+4)$, of the preliminary digital drive signals $S(t)$, and where 1413 denotes even samples, $\hat{S}(8t)$, of the preliminary digital drive signals S(t). The application of the matrix transformation $H_4$ at 1410 is shown in Eq. 23.

$$\begin{pmatrix} F_1(8t+4) \\ F_1(8t) \end{pmatrix} = H_4 \begin{pmatrix} \hat{S}(8t+4) \\ \hat{S}(8t) \end{pmatrix} \quad (23)$$

pFDM channel 1 is constructed from the odd samples $\hat{S}(2t+1)$ denoted by 1403. pFDM channel 2 is constructed from the even samples $\hat{S}(4t+2)$ denoted by 1407. pFDM channel 3 is constructed from the even samples $\hat{S}(8t+4)$ denoted by 1411. pFDM channel 4 is constructed from the even samples $\hat{S}(8t)$ denoted by 1413.

Due to the nature of the matrix transformation $H_4$, the transformed digital drive signals S(t) are determined from simple addition and subtraction of the preliminary digital drive signals S(t). Accordingly, the computational requirements are significantly lower than those involved with multiplication using an 8×8 matrix.

The pFDM transformation of FIG. 14 is such that each set of preliminary digital drive signals 1413 (corresponding to pFDM channel 4) will be combined with one set of preliminary digital drive signals 1411 (corresponding to pFDM channel 3), two sets of preliminary digital drive signals 1407 (corresponding to pFDM channel 2), and four sets of preliminary digital drive signals 1403 (corresponding to pFDM channel 1), thereby resulting in a total of eight sets preliminary digital drive signals S(t), which are distributed over four pFDM channels. The sets of preliminary digital drive signals S(t), are unevenly distributed over the pFDM channels, such that some channels transmit more signals (e.g., pFDM channels 1 and 2), and other channels transmit fewer signals (e.g., pFDM channels 3 and 4). Each set of preliminary digital drive signals ultimately results in a corresponding set of transformed digital drive signals S(t).

More generally, N sets of preliminary digital drive signals corresponding to N respective timeslots may be representative of M pFDM channels, where M>1, and where M≤N. The N sets of preliminary digital drive signals may be combined, according to a pFDM transformation, to generate N sets of transformed digital drive signals.

According to the fourth example, an inverse pFDM transformation implemented at a receiver comprises an inverse matrix transformation $H_4^{-1}$ provided in Eq. 24.

$$H_4^{-1} \triangleq \begin{pmatrix} 1 & -1 \\ 1 & 1 \end{pmatrix} \quad (24)$$

Figure 15:
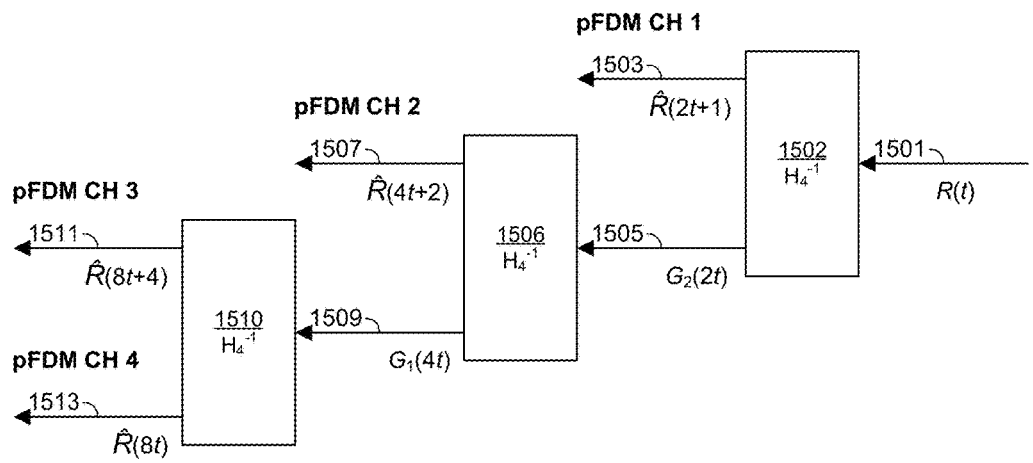
FIG. 15 is a schematic diagram illustrating the implementation of an inverse pFDM transformation according to the fourth example.

FIG. 15 is a schematic diagram illustrating the implementation of the inverse pFDM transformation according to the fourth example.

The received digital drive signals R(t) are denoted by 1501. The inverse matrix transformation $H_4^{-1}$ is applied at 1502 to the received signals R(t) to generate two data streams 1503 and 1505, where 1503 denotes odd samples, $\hat{R}(2t+1)$, of preliminary digital drive signal estimates $\hat{R}(t)$, and where 1505 denotes a data stream $G_2(2t)$. The application of the inverse matrix transformation $H_4^{-1}$ at 1502 is shown in Eq. 25.

$$\begin{pmatrix} G_2(2t) \\ \hat{R}(2t+1) \end{pmatrix} = H_4^{-1} \begin{pmatrix} R(2t) \\ R(2t+1) \end{pmatrix} \quad (25)$$

The inverse matrix transformation $H_4^{-1}$ is recursively applied at 1506 to the stream $G_2(2t)$ to generate two data streams 1507 and 1509, where 1507 denotes even samples, $\hat{R}(4t+2)$, of preliminary digital drive signal estimates $\hat{R}(t)$, and where 1509 denotes a data stream $G_1(4t)$. The application of the inverse matrix transformation $H_4^{-1}$ at 1506 is shown in Eq. 26.

$$\begin{pmatrix} \hat{R}(4t+2) \\ G_1(4t) \end{pmatrix} = H_4^{-1} \begin{pmatrix} G_2(4t+2) \\ G_2(4t) \end{pmatrix} \quad (26)$$

The inverse matrix transformation $H_4^{-1}$ is recursively applied at 1510 to the stream $G_1(4t)$ to generate two data streams 1511 and 1513, where 1511 denotes even samples, $\hat{R}(8t+4)$, of preliminary digital drive signal estimates $\hat{R}(t)$, and where 1513 denotes even samples, $\hat{R}(8t)$, of preliminary digital drive signal estimates $\hat{R}(t)$. The application of the inverse matrix transformation $H_4^{-1}$ at 1510 is shown in Eq. 27.

$$\begin{pmatrix} \hat{R}(8t+4) \\ \hat{R}(8t) \end{pmatrix} = H_4^{-1} \begin{pmatrix} G_1(8t+4) \\ G_1(8t) \end{pmatrix} \quad (27)$$

The data stream $\hat{R}(2t+1)$, denoted by 1503, corresponds to the received signal estimates for pFDM channel 1. The data stream $\hat{R}(4t+2)$, denoted by 1507, corresponds to the received signal estimates for pFDM channel 2. The data stream $\hat{R}(8t+4)$, denoted by 1511, corresponds to the received signal estimates for pFDM channel 3. The data stream $\hat{R}(8t)$, denoted by 1513, corresponds to the received signal estimates for pFDM channel 4.

The inverse pFDM transformation of FIG. 15 is such that, for eight sets of received digital signals R(t) 1501, the resulting preliminary digital drive signal estimates $\hat{R}(t)$ will include four sets of preliminary digital drive signal estimates 1503 (corresponding to pFDM channel 1), two sets of preliminary digital drive signal estimates 1507 (corresponding to pFDM channel 2), one set of preliminary digital drive signal estimates 1511 (corresponding to pFDM channel 3), and one set of preliminary digital drive signal estimates 1513 (corresponding to pFDM channel 4), thereby resulting in a total of eight sets preliminary digital drive signal estimates $\hat{R}(t)$, which are distributed over four pFDM channels. The sets of preliminary digital drive signal estimates $\hat{R}(t)$ are unevenly distributed over the pFDM channels, such that more signal estimates are determined from some channels (e.g., pFDM channels 1 and 2), and fewer signal estimates are determined from other channels (e.g., pFDM channels 3 and 4). Each set of received digital signals R(t) ultimately results in a corresponding set of preliminary digital drive signal estimates $\hat{R}(t)$.

More generally, N sets of preliminary digital drive signal estimates corresponding to N respective timeslots may be representative of M pFDM channels, where M>1, and M≤N. The N sets of preliminary digital drive signal estimates may be determined, according to an inverse pFDM transformation, from N sets of received digital signals.

Figure 16:
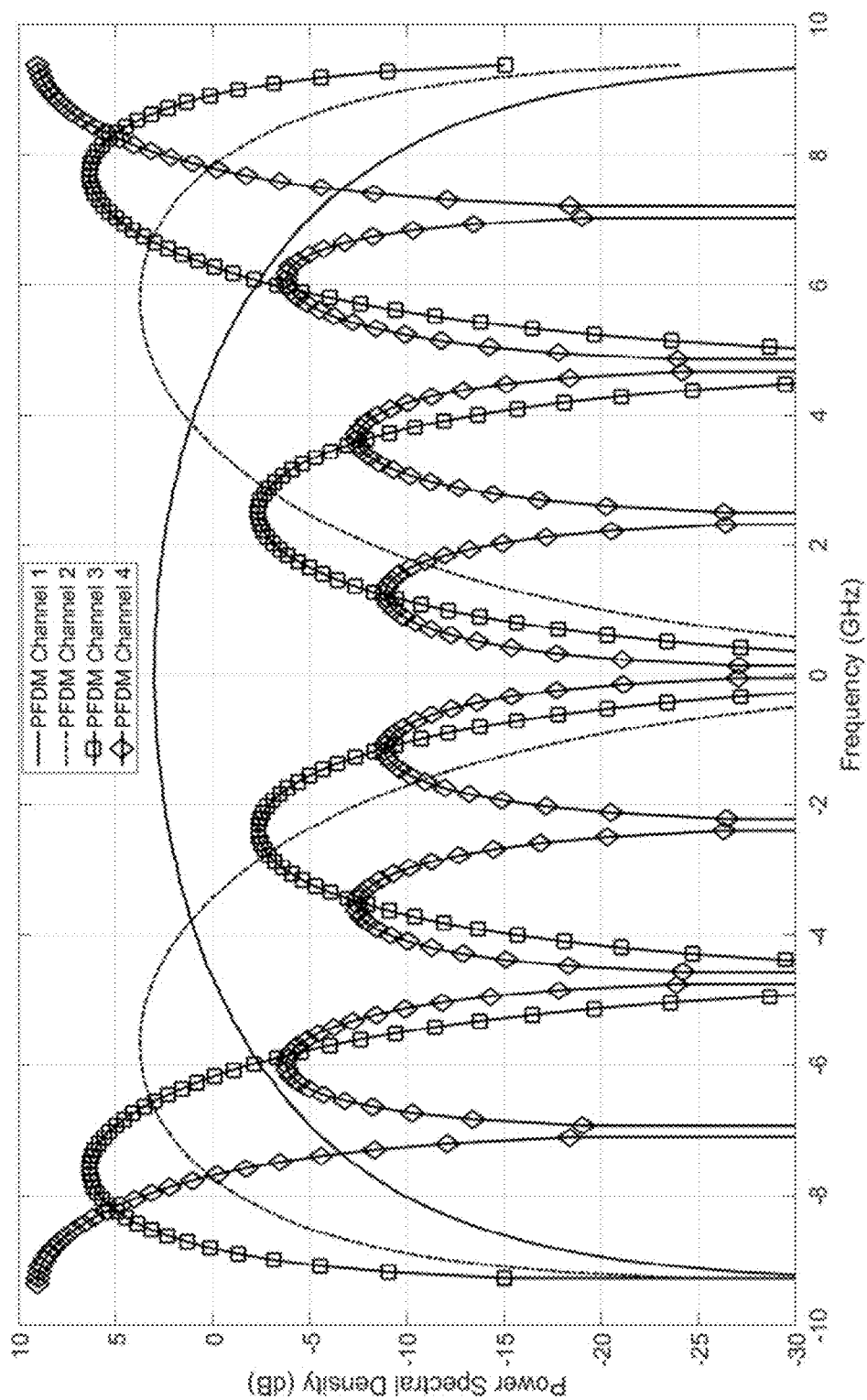
FIG. 16 is a plot of power spectral density as a function of frequency for pDFM channels resulting from a pFDM transformation in accordance with the fourth example being applied to a single FDM channel.
Figure 17:
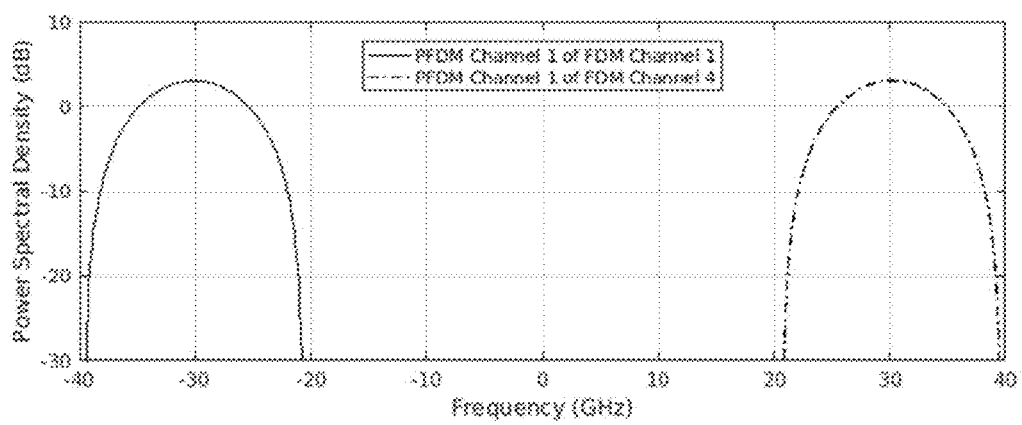
FIGS. 17-21 illustrate plots of power spectral density as a function of frequency for pDFM channels and FDM channels, the pFDM channels resulting from a pFDM transformation in accordance with the fourth example being applied to two out of four FDM channels.
Figure 18:
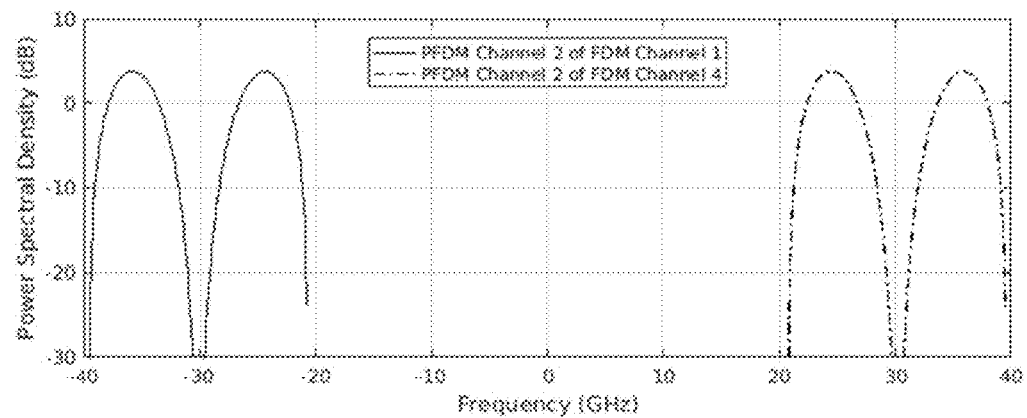
Figure 19:
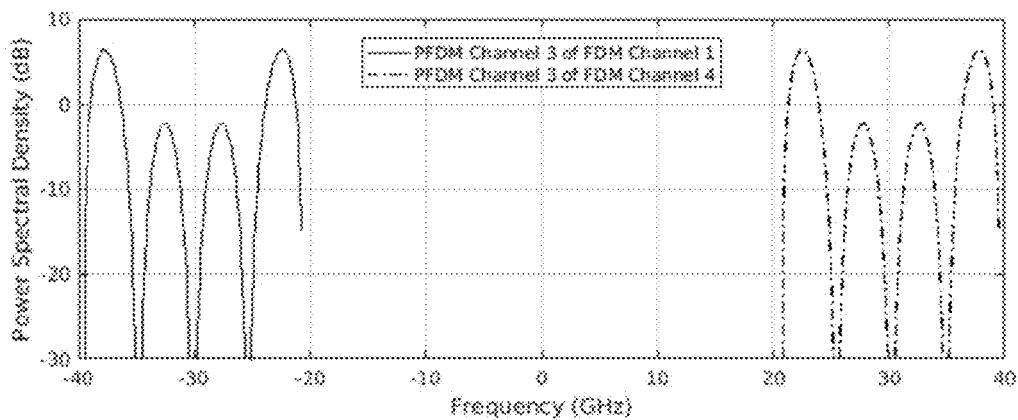

FIG. 16 is a plot of power spectral density (dB) as a function of frequency (GHz) for pFDM channels resulting from a pFDM transformation in accordance with the fourth example being applied to a single FDM channel. In this example, the FDM channel occupies 20 GHz.

pFDM channel 1, shown in solid line, has a 3 dB bandwidth that is ½ of the original bandwidth of the FDM channel. pFDM channel 2, shown in dash-dotted line, has a 3 dB bandwidth that is ¼ of the original bandwidth of the FDM channel. pFDM channel 3, shown in solid line with square markers, has a 3 dB bandwidth that is ⅛ of the original bandwidth of the FDM channel. pFDM channel 4, shown in solid line with diamond markers, has a 3 dB bandwidth that is ⅛ of the original bandwidth of the FDM channel.

The pFDM channel having the largest bandwidth, pFDM channel 1, is maximally separated away from the outer edges of the FDM channel, which may suffer from degradations due to optical filtering. pFDM channel 2 is orthogonal to pFDM channel 1, while also being maximally distanced from the outer edges of the FDM channel. pFDM channel 4, which has the smallest bandwidth, is centered at the edge of the FDM channel. Accordingly, pFDM channel 4 will suffer the most from optical filtering.

It is notable that applying a pFDM transformation involving an 8×8 matrix would have resulted in each pFDM channel having a 3 dB bandwidth of ⅛ of the original bandwidth of the FDM channel. By applying the matrix transformation $H_4$ three times in a binary tree, pFDM channels 1 and 2 have 3 dB bandwidths that are significantly larger than ⅛ of the original bandwidth of the FDM channel.

In general, a pFDM transformation comprising the matrix transformation $H_4$ may be applied N times in a binary tree to provide N+1 pFDM channels with respective bandwidths $$\frac{1}{2}, \frac{1}{4}, \ldots, \frac{1}{2^N}, \frac{1}{2^N}$$

of the original FDM channel. For example, if the matrix transformation $H_4$ is applied N=4 times, the result would be five pFDM channels with 3 dB bandwidths that are respectively ½, ¼, ⅛, ¹⁄₁₆, ¹⁄₁₆, of the original bandwidth of the FDM channel. In contrast, a pFDM transformation involving a 16×16 matrix would have resulted in each pFDM channel having a 3 dB bandwidth of ¹⁄₁₆ of the original bandwidth of the FDM channel. By applying $H_4$ five times in a binary tree, most of pFDM channels would have a significantly larger 3 dB bandwidth than ¹⁄₁₆ of the original bandwidth of the FDM channel.

The pFDM transformation may support pseudo-subcarriers with different baud-rates over the same channel. This feature may be useful for the links that suffer from narrow-band optical filters due to wavelength-selective switches and reconfigurable optical add/drop multiplexers (ROADMs). For the high-frequency portion of spectrum, the pFDM channels may be narrower, while for the low-frequency portion of spectrum, the pFDM channels may be wider.

It may be of interest to apply pFDM transformations to some FDM channels, but not to others. For example, there may be a significant advantage to applying a pFDM transformation to outer FDM channels which are affected more by optical filtering, whereas there may be little or no advantage to applying a pFDM transformation to inner FDM channels which are affected less by optical filtering.

FIGS. 17-21 illustrate plots of power spectral density (dB) as a function of frequency (GHz) for pDFM channels and FDM channels, the pFDM channels resulting from a pFDM transformation in accordance with the fourth example being applied to two out of four FDM channels.

As before, each FDM channel occupies 20 GHz. FDM channel 1 spans −40 GHz to −20 GHz; FDM channel 2 spans −20 GHz to 0 GHz; FDM channel 3 spans 0 GHz to 20 GHz; and FDM channel 4 spans 20 GHz to 40 GHz. In this example, the pFDM transformation according to the fourth example is applied to FDM channels 1 and 4 only (the outer channels), and not applied to FDM channels 2 and 3 (the inner channels). Accordingly, the power spectral density of FDM channels 2 and 3 is not altered, as is apparent from the plot of FIG. 21.

Figure 20:
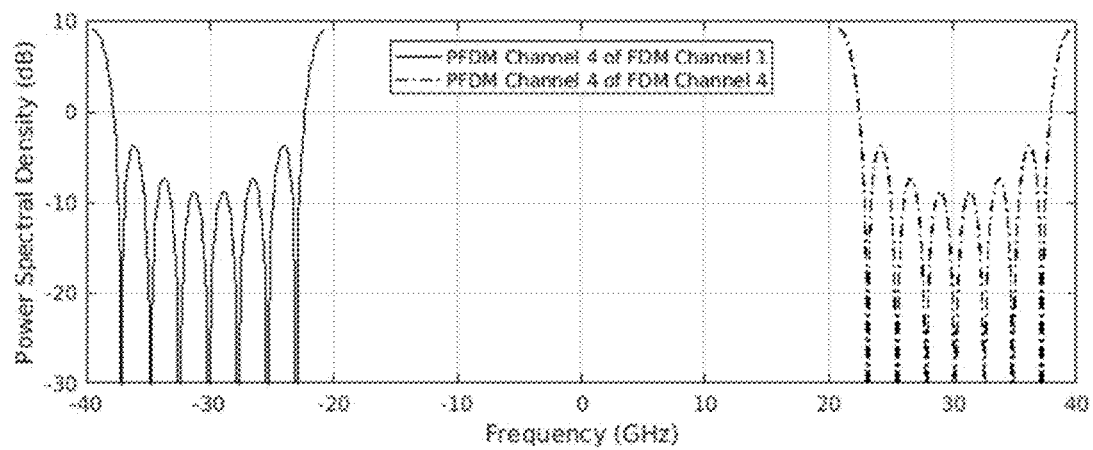
Figure 21:
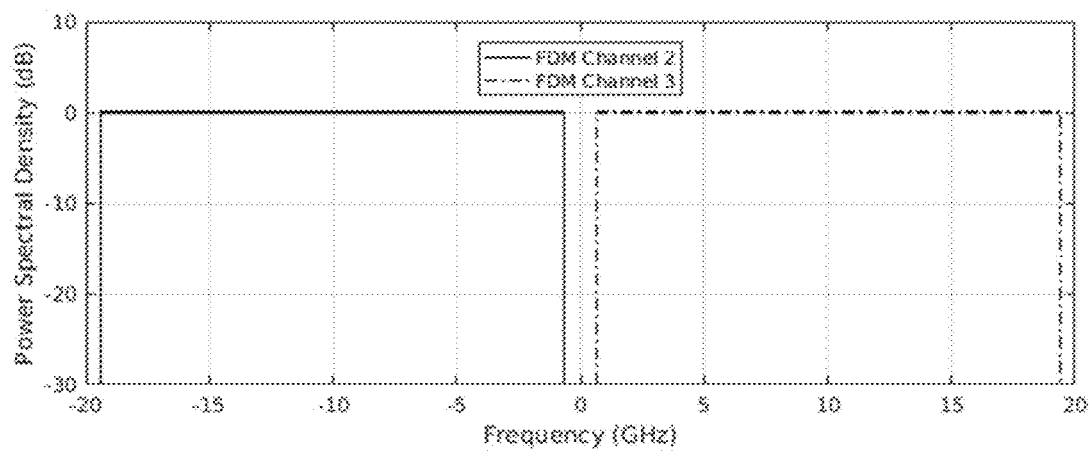

The solid lines shown in FIGS. 17-20, respectively, denote the four pFDM channels that result from applying the pFDM transformation to FDM channel 1. Similarly, the dash-dotted lines shown in FIGS. 17-20, respectively, denote the four pFDM channels that result from applying the pFDM transformation to FDM channel 4. As shown in FIG. 20, pFDM channel 4 of FDM channel 1 and pFDM channel 4 of FDM channel 4 are the pFDM channels that are closest to the edges of the two outer FDM channels, and consequently are expected to suffer the most from optical filtering. However, these are also the pFDM channels having the smallest bandwidth. Accordingly, significant SNR improvements may be achieved by limiting the amount of information transmitted over these pFDM channels, but without having to sacrifice much bandwidth.

In the preceding examples, pFDM transformations are implemented using Hadamard Matrices or complex exponential matrices. However, other substantially unitary matrices may be used to average or divide symbol streams.

According to some examples, distinct modulation schemes and/or distinct shaping may be used to transmit different streams of multi-bit symbols over different FDM channels or pFDM channels. The modulation scheme and/or shaping to be used for a particular stream may be selected based upon the level of noise or nonlinearity that is anticipated for that stream. Alternatively, measurements performed at a receiver may be used in these determinations.

According to some examples, the pFDM transformation techniques described herein may be performed in addition to the dimensional transformation techniques described by Khandani et al. in U.S. patent application Ser. No. 16/003, 736 filed on Jun. 8, 2018. For example, a pFDM transformation may be combined with a dimensional transformation and implemented in a single step. Alternatively, a pFDM transformation and a dimensional transformation may be performed in separate stages.

The scope of the claims should not be limited by the details set forth in the examples, but should be given the broadest interpretation consistent with the description as a whole.

What is claimed is:

1. A method performed at an optical receiver, the method comprising:

receiving an optical signal over an optical communications channel established between the optical receiver and an optical transmitter, wherein the received optical signal comprises a degraded version of a modulated optical signal generated at the optical transmitter;

determining N sets of received digital signals corresponding to N respective frequency division multiplexing (FDM) channels of the received optical signal at a single timeslot, wherein N>1;

determining N sets of preliminary signal estimates using the N sets of received digital signals and an inverse pseudo FDM (pFDM) transformation, wherein each set of preliminary signal estimates is determined from a respective combination of the N sets of received digital signals, and wherein each respective combination is determined from the inverse pFDM transformation; and determining N multi-bit symbol estimates using the N respective sets of preliminary signal estimates.

2. The method as claimed in claim 1, wherein the inverse pFDM transformation averages frequency-dependent signal degradations in the received digital signals.

3. The method as claimed in claim 1, wherein the inverse pFDM transformation comprises a matrix, and wherein the matrix is substantially linear and substantially unitary.

4. The method as claimed in claim 1, wherein the dimensions of the optical carrier are modulated at the optical transmitter based on transformed digital drive signals, the transformed digital drive signals having been determined at the optical transmitter using a pFDM transformation and preliminary digital drive signals.

5. The method as claimed in claim 4, wherein the pFDM transformation comprises a first matrix, wherein the inverse pFDM transformation comprises a second matrix, wherein the first and second matrices are substantially linear and substantially unitary, and wherein the second matrix is substantially the inverse of the first matrix.

6. The method as claimed in claim 5, wherein the first matrix is frequency-dependent.

7. The method as claimed in claim 5, where the pFDM transformation involves time-domain linear filtering.

8. An optical receiver configured to receive an optical signal over an optical communications channel established between the optical receiver and an optical transmitter, wherein the received optical signal comprises a degraded version of a modulated optical signal generated at the optical transmitter, the optical receiver comprising:

a processor; and a memory storing computer-executable instructions which, when executed by the processor, cause the optical receiver to determine N sets of received digital signals corresponding to N respective timeslots for a single division multiplexing (FDM) channel of the received optical signal, the N sets of received digital signals being distributed over M pseudo FDM (pFDM) channels that are partially overlapping and non-orthogonal in frequency, wherein N>1, wherein M>1, and wherein M≤N;

to determine N sets of preliminary digital drive signal estimates using the N sets of received digital signals and an inverse pFDM transformation, wherein each set of preliminary digital drive signal estimates is determined from a respective combination of the N sets of received digital signals, wherein each respective combination is determined from the inverse pFDM transformation; and to determine N multi-bit symbol estimates using the N respective sets of preliminary digital drive signal estimates.

9. The optical receiver as claimed in claim 8, wherein the timeslots are consecutive.

10. The optical receiver as claimed in claim 8, wherein the inverse pFDM transformation is implemented by recursive matrix multiplication using a substantially linear and substantially unitary matrix, and wherein M<N.

11. The optical receiver as claimed in claim 8, wherein the pFDM channels have substantially equal bandwidths.

12. The optical receiver as claimed in claim 8, wherein the pFDM channels have a range of bandwidths.

13. The optical receiver as claimed in claim 12, wherein the N sets of received digital signals are unevenly distributed over the M pFDM channels.

14. An optical receiver configured to receive an optical signal over an optical communications channel established between the optical receiver and an optical transmitter, wherein the received optical signal comprises a degraded version of a modulated optical signal generated at the optical transmitter, the optical receiver comprising:
- a processor; and
- a memory storing computer-executable instructions which, when executed by the processor, cause the optical receiver
- to determine N sets of received digital signals corresponding to N respective frequency division multiplexing (FDM) channels of the received optical signal at a single timeslot, wherein N>1;
- to determine N sets of preliminary signal estimates using the N sets of received digital signals and an inverse pseudo FDM (pFDM) transformation, wherein each set of preliminary signal estimates is determined from a respective combination of the N sets of received digital signals, and wherein each respective combination is determined from the inverse pFDM transformation; and
- to determine N multi-bit symbol estimates using the N respective sets of preliminary signal estimates.

15. The optical receiver as claimed in claim 14, wherein the inverse pFDM transformation averages frequency-dependent signal degradations in the received digital signals.

16. The optical receiver as claimed in claim 14, wherein the inverse pFDM transformation comprises a matrix, and wherein the matrix is substantially linear and substantially unitary.

17. The optical receiver as claimed in claim 14, wherein the dimensions of the optical carrier are modulated at the optical transmitter based on transformed digital drive signals, the transformed digital drive signals having been determined at the optical transmitter using a pFDM transformation and preliminary digital drive signals.

18. The optical receiver as claimed in claim 17, wherein the pFDM transformation comprises a first matrix, wherein the inverse pFDM transformation comprises a second matrix, wherein the first and second matrices are substantially linear and substantially unitary, and wherein the second matrix is substantially the inverse of the first matrix.

19. The optical receiver as claimed in claim 18, wherein the first matrix is frequency-dependent.

20. The optical receiver as claimed in claim 18, where the pFDM transformation involves time-domain linear filtering.

* * * * *